(12) United States Patent
Park et al.

(10) Patent No.: US 10,333,680 B2
(45) Date of Patent: Jun. 25, 2019

(54) METHOD OF REPORTING CSI IN WIRELESS COMMUNICATION SYSTEM SUPPORTING UNLICENSED BAND AND APPARATUS SUPPORTING THE SAME

(71) Applicant: LG ELECTRONICS INC., Seoul (KR)

(72) Inventors: Hanjun Park, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 15/299,300

(22) Filed: Oct. 20, 2016

(65) Prior Publication Data

US 2017/0117997 A1 Apr. 27, 2017

Related U.S. Application Data

(60) Provisional application No. 62/244,202, filed on Oct. 21, 2015, provisional application No. 62/250,529, filed on Nov. 4, 2015, provisional application No. 62/257,655, filed on Nov. 19, 2015, provisional application No. 62/257,748, filed on Nov. 20, 2015, provisional application No. 62/258,427, filed on Nov. 21, 2015, provisional application No. 62/260,660, filed on Nov. 30, 2015, provisional application No. 62/262,340, filed on Dec. 2, 2015.

(51) Int. Cl.
*H04L 5/00* (2006.01)
*H04L 1/00* (2006.01)

(52) U.S. Cl.
CPC .......... *H04L 5/0057* (2013.01); *H04L 1/0026* (2013.01); *H04L 5/005* (2013.01)

(58) Field of Classification Search
CPC ... H04L 5/0048; H04L 5/0057; H04L 1/0026; H04L 5/005; H04W 72/0446
See application file for complete search history.

(56) References Cited

U.S. PATENT DOCUMENTS

| | | | | |
|---|---|---|---|---|
| 9,467,881 B2* | 10/2016 | Seo | ........................... | H04J 11/00 |
| 10,110,428 B2* | 10/2018 | Um | ..................... | H04L 41/0803 |
| 2014/0018118 A1* | 1/2014 | Hammarwall | ........ | H04L 5/0057 |
| | | | | 455/501 |
| 2014/0105042 A1* | 4/2014 | Cui | ....................... | H04W 24/00 |
| | | | | 370/252 |
| 2014/0133340 A1* | 5/2014 | Zhou | ................... | H04L 25/0204 |
| | | | | 370/252 |

(Continued)

*Primary Examiner* — Wutchung Chu
(74) *Attorney, Agent, or Firm* — Lee, Hong, Degerman, Kang & Waimey PC

(57) ABSTRACT

A method of measuring and then reporting Channel State Information (CSI) in a wireless communication system supporting an unlicensed band and an apparatus supporting the same are disclosed. A method of reporting CSI by a UE includes receiving transmission burst sequence information regarding each subframe from a BS, measuring CSI using one or more resources among a Common Reference Signal (CRS), CSI Reference Signal (CSI-RS), and CSI Interference Measurement (CSI-IM) resources in one or more consecutive subframes having the same transmission burst sequence information, and reporting the measured CSI.

16 Claims, 13 Drawing Sheets

(56) References Cited

U.S. PATENT DOCUMENTS

| | | | |
|---|---|---|---|
| 2014/0200012 A1* | 7/2014 | Ito | H04W 24/02 |
| | | | 455/450 |
| 2014/0211723 A1* | 7/2014 | Xia | H04L 5/0051 |
| | | | 370/329 |
| 2014/0241194 A1* | 8/2014 | Zhou | H04L 5/0057 |
| | | | 370/252 |
| 2014/0313912 A1* | 10/2014 | Jongren | H04W 24/10 |
| | | | 370/252 |
| 2014/0321313 A1* | 10/2014 | Seo | H04J 11/00 |
| | | | 370/252 |
| 2014/0355468 A1* | 12/2014 | Li | H04W 24/10 |
| | | | 370/252 |
| 2015/0029982 A1* | 1/2015 | Nagata | H04W 28/18 |
| | | | 370/329 |
| 2015/0043673 A1* | 2/2015 | Lee | H04B 7/0469 |
| | | | 375/267 |
| 2015/0163008 A1* | 6/2015 | Kim | H04J 11/0069 |
| | | | 370/252 |
| 2015/0201319 A1* | 7/2015 | Deng | H04W 48/16 |
| | | | 455/452.1 |
| 2016/0227424 A1* | 8/2016 | Chen | H04W 24/08 |
| 2016/0302230 A1* | 10/2016 | Novlan | H04B 17/318 |
| 2017/0141832 A1* | 5/2017 | Ji | H04B 7/0626 |
| 2017/0150480 A1* | 5/2017 | Kim | H04W 72/02 |
| 2017/0302346 A1* | 10/2017 | Jeong | H04B 7/0478 |
| 2017/0347270 A1* | 11/2017 | Iouchi | H04W 16/14 |
| 2018/0205439 A1* | 7/2018 | Chen | H04B 7/04 |
| 2018/0220458 A1* | 8/2018 | Ouchi | H04J 11/00 |
| 2018/0227838 A1* | 8/2018 | Hayashi | H04L 5/001 |
| 2018/0288715 A1* | 10/2018 | Ye | H04B 17/318 |

* cited by examiner

FIG. 10
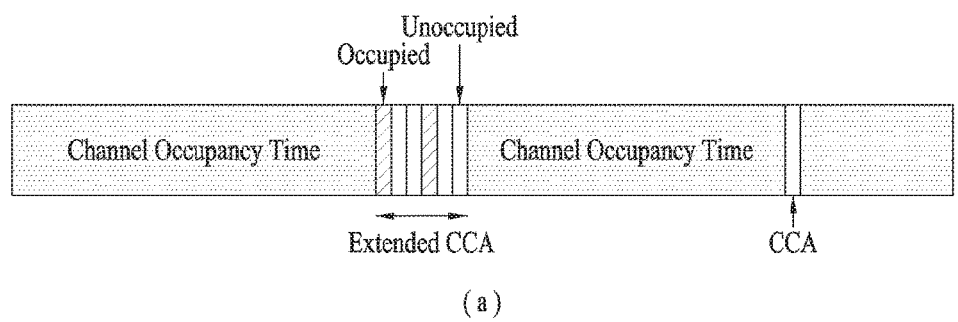
(a)
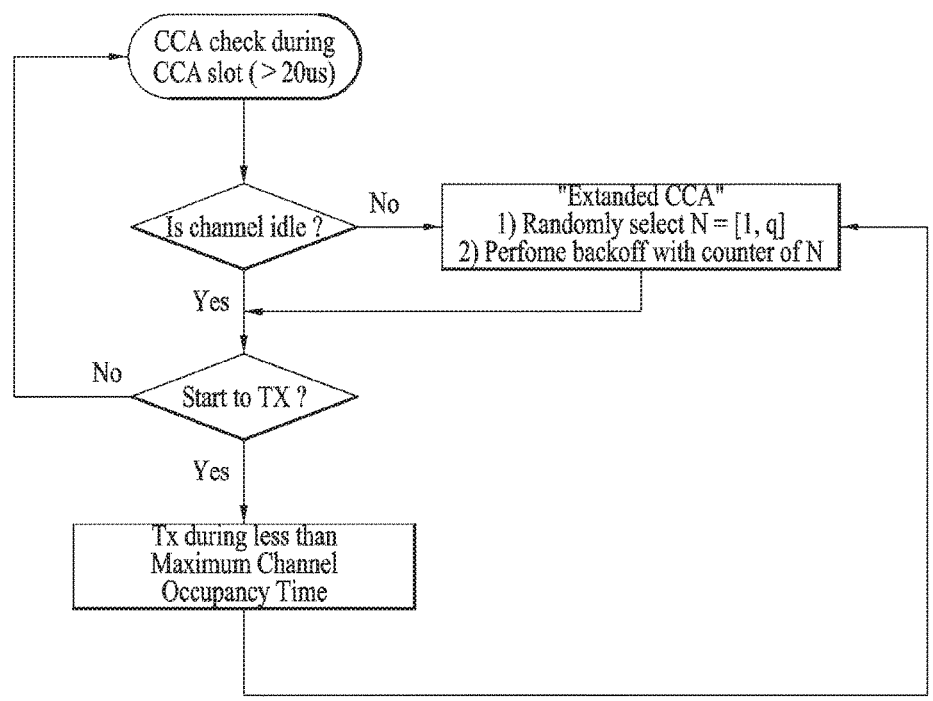
(b)

METHOD OF REPORTING CSI IN WIRELESS COMMUNICATION SYSTEM SUPPORTING UNLICENSED BAND AND APPARATUS SUPPORTING THE SAME

CROSS-REFERENCE TO RELATED APPLICATIONS

Pursuant to 35 U.S.C. § 119, this application claims the benefit of U.S. Provisional Application Nos. 62/244,202, filed on Oct. 21, 2015, 62/250,529, filed on Nov. 4, 2015, 62/257,655, filed on Nov. 19, 2015, 62/257,748, filed on Nov. 20, 2015, 62/258,427, filed on Nov. 21, 2015, 62/260,660, filed on Nov. 30, 2015, and 62/262,340, filed on Dec. 2, 2015, the contents of which are all hereby incorporated by reference herein in their entirety.

BACKGROUND OF THE INVENTION

Field of the Invention

The following description relates to a wireless communication system supporting an unlicensed band and, more particularly, to a method of reporting measured Channel State Information (CSI) and an apparatus supporting the same.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

SUMMARY OF THE INVENTION

An object of the present invention is to provide a method of efficiently measuring CSI and reporting the measured CSI in a wireless access system supporting an unlicensed band.

Another object of the present invention is to provide a method of reliably measuring CSI and reporting the measured CSI by a UE, when an eNB or the UE performs Listen-Before-Talk (LBT) based signal transmission and the eNB dynamically changes transmission power.

It will be appreciated by persons skilled in the art that the objects that could be achieved with the present invention are not limited to what has been particularly described hereinabove and the above and other objects that the present invention could achieve will be more clearly understood from the following detailed description.

To achieve these objects and other advantages and in accordance with the purpose of the invention, as embodied and broadly described herein, a method of reporting Channel State Information (CSI) by a User Equipment (UE) in a wireless communication system supporting an unlicensed band includes receiving transmission burst sequence information regarding each subframe from a Base Station (BS), measuring CSI using one or more resources among a Common Reference Signal (CRS), CSI Reference Signal (CSI-RS), and CSI Interference Measurement (CSI-IM) resources in one or more consecutive subframes having the same transmission burst sequence information, and reporting the measured CSI.

The transmission burst sequence information may indicate 0 or 1 and, if a transmission burst of an N-th subframe (where N is a natural number) is distinguished from a transmission burst of an (N+1)-th subframe, transmission burst sequence information regarding the (N+1)-th subframe may indicate a different value from transmission burst sequence information regarding the N-th subframe.

The transmission burst sequence information may indicate one of a plurality of states and, if a transmission burst of an N-th subframe (where N is a natural number) is distinguished from a transmission burst of an (N+1)-th subframe, transmission burst sequence information regarding the (N+1)-th subframe may indicate a next state of transmission burst sequence information regarding the N-th subframe.

The method may further include initializing CSI measurement in a subframe in which the transmission burst sequence information is not detected upon failing to detect the transmission burst sequence information regarding each subframe received from the BS.

The measuring the CSI may include measuring CSI for the one or more consecutive subframes having the same transmission burst sequence information by applying time-axis filtering.

The method may further include receiving transmission power information regarding each subframe from the BS and the measuring the CSI may include measuring scaled CSI based on a ratio of preset reference power information to transmission power information of the one or more subframes having the same transmission burst sequence information.

The measuring the CSI may include measuring the CSI by applying interference only in a preset range.

Upon receiving information indicating that a specific subframe is an ending partial subframe from the eNB, the measuring the CSI may include measuring the CSI using only one or more resources of the CRS, CSI-RS, and CSI-IM resources included in a predetermined number of Orthogonal Frequency Division Multiplexing (OFDM) symbols in the specific subframe.

The reporting the measured CSI may include reporting the measured CSI in an N-th subframe (where N is a natural number) and the one or more subframes in which the UE measures the CSI are earlier than an (N−k)-th subframe (where k is a preset value) in time.

In another aspect of the present invention, a User Equipment (UE) for reporting Channel State Information (CSI) in a wireless communication system supporting an unlicensed band includes a transmitter, a receiver, and a processor connected to the transmitter and the receiver to perform an operation, wherein the processor receives transmission burst sequence information regarding each subframe from a Base Station (BS), measures CSI using one or more resources among a Common Reference Signal (CRS), CSI Reference Signal (CSI-RS), and CSI Interference Measurement (CSI-IM) resources in one or more consecutive subframes having the same transmission burst sequence information, and reports the measured CSI.

The afore-described aspects of the present invention are merely a part of preferred embodiments of the present invention. Those skilled in the art will derive and understand various embodiments reflecting the technical features of the present invention from the following detailed description of the present invention.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 10 is a diagram illustrating an exemplary LBE operation which is one part of an LBT procedure;

DETAILED DESCRIPTION OF THE INVENTION

Figure 1:
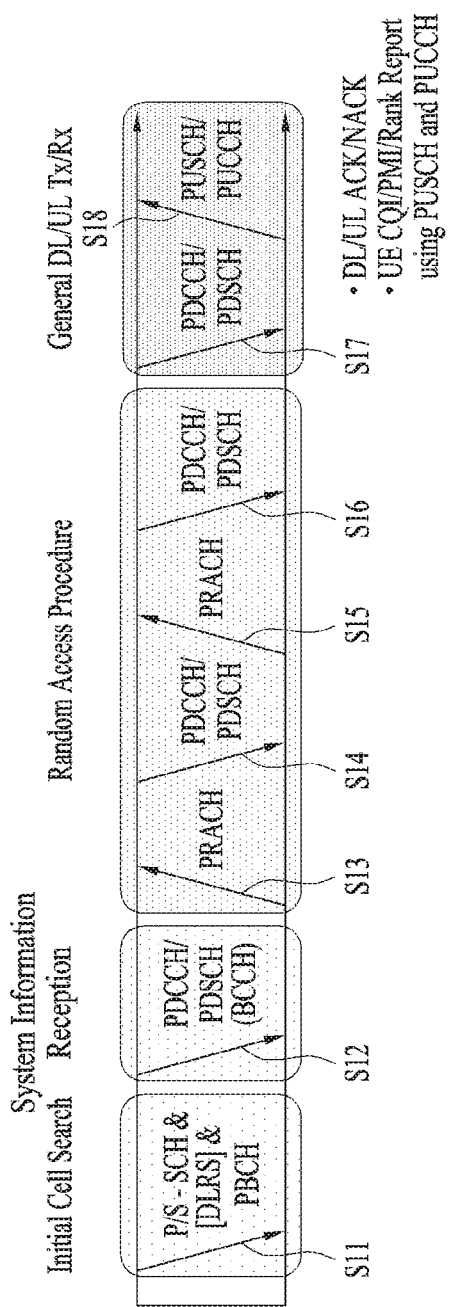
FIG. 1 illustrates physical channels and a general signal transmission method using the physical channels, which may be used in embodiments of the present invention.

Embodiments of the present invention described below in detail provide a method for transmitting and receiving a data symbol using a correlation between antennas that form a massive antenna, and apparatuses supporting the method.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" "an", "one", "the" etc. may include a singular representation and a plural representation in the context of the present invention (more particularly, in the context of the following claims) unless indicated otherwise in the specification or unless context clearly indicates otherwise.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term Transmission Opportunity Period ((TxOP) may have the same meaning as transmission burst or Reserved Resource Period (RRP). In addition, a Listen-Before-Talk (LBT) procedure may be performed for the same purpose as a carrier sensing procedure, Clear Channel Assessment (CCA), or a Channel Access Procedure (CAP) to determine whether a channel state is idle.

Hereinafter, a 3GPP LTE/LTE-A system will be described as an example of a wireless access system to which embodiments of the present invention are applicable.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
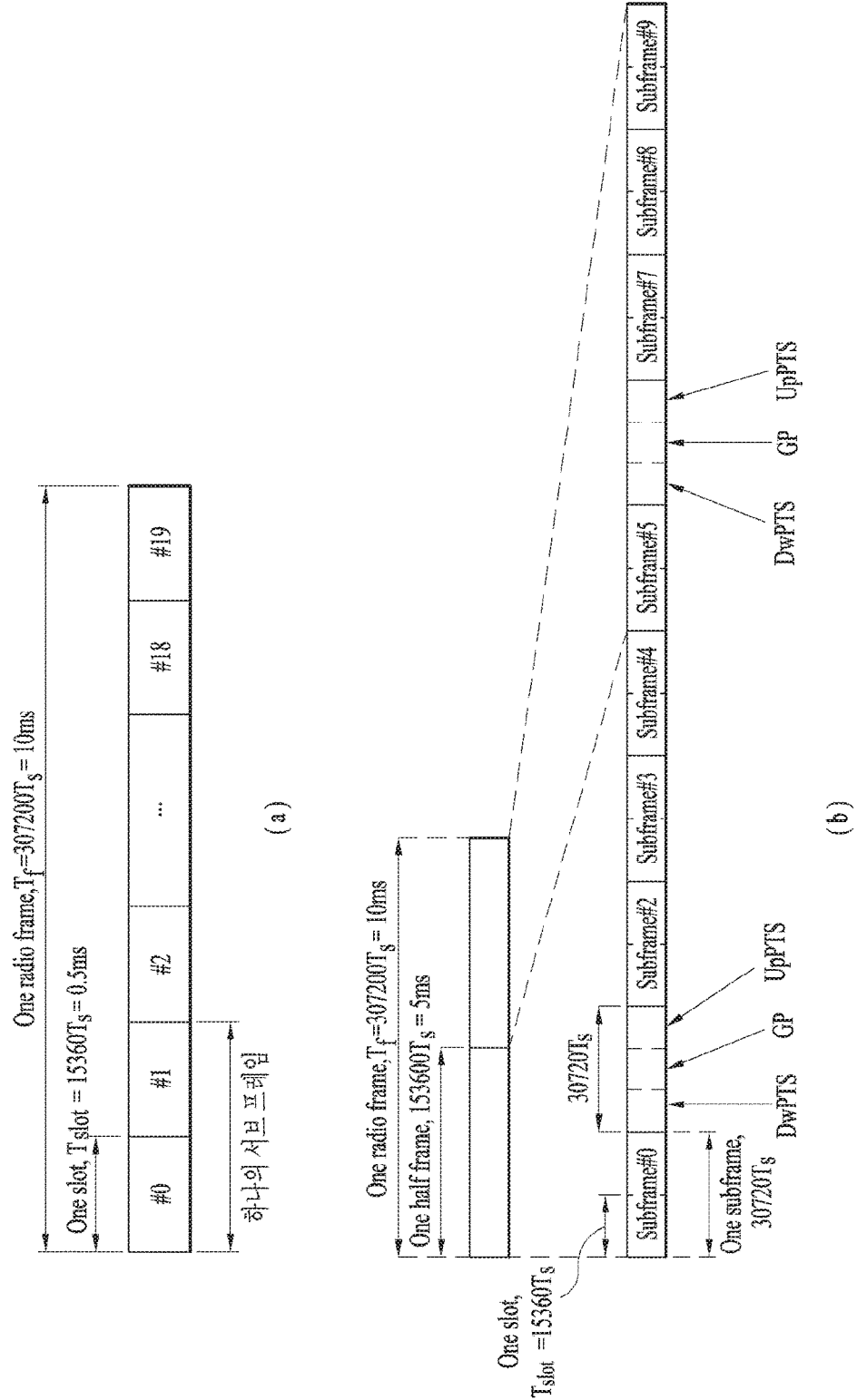
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD)

system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group. Embodiments of the present invention described below in detail provide a method for transmitting and receiving a data

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
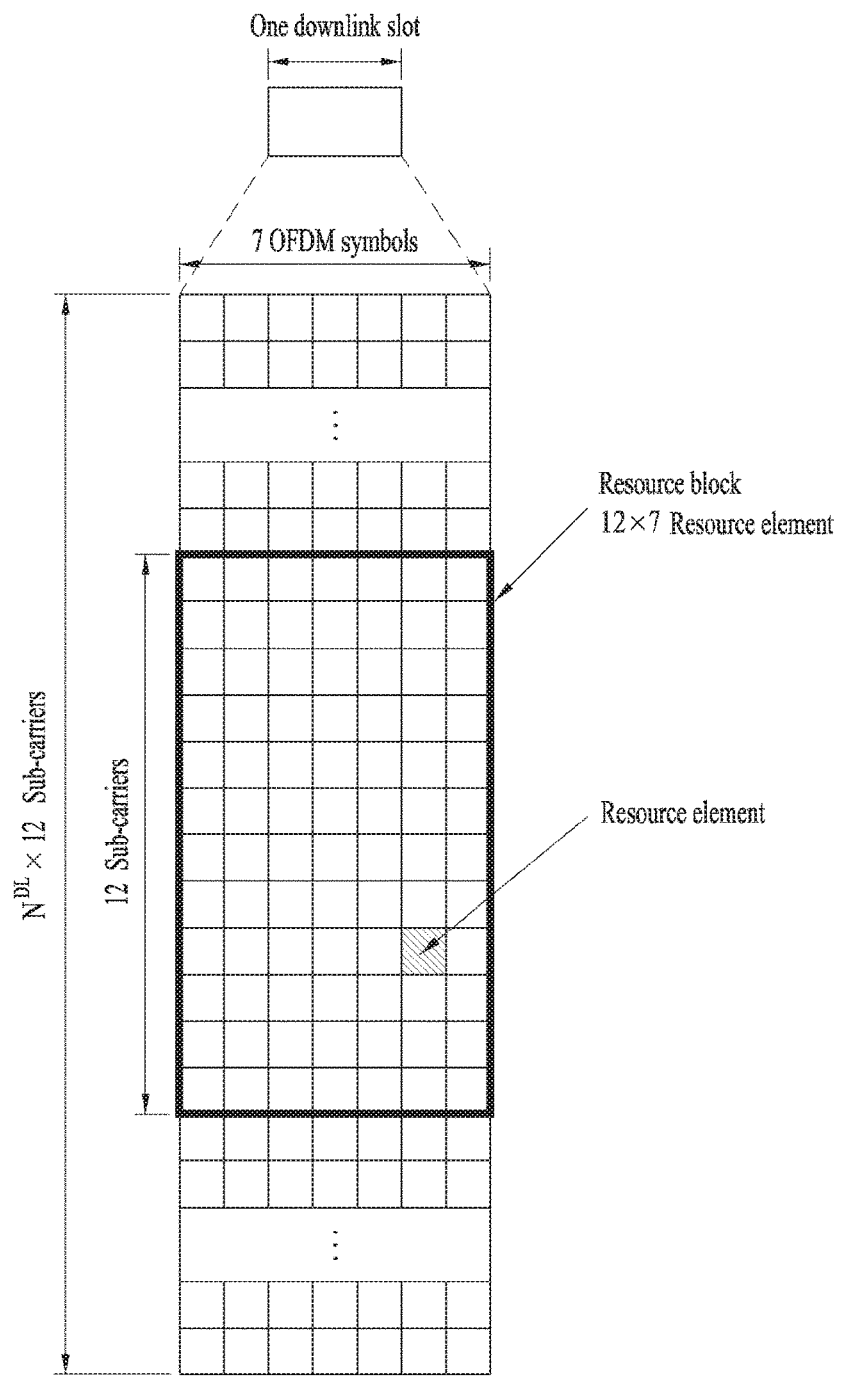
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
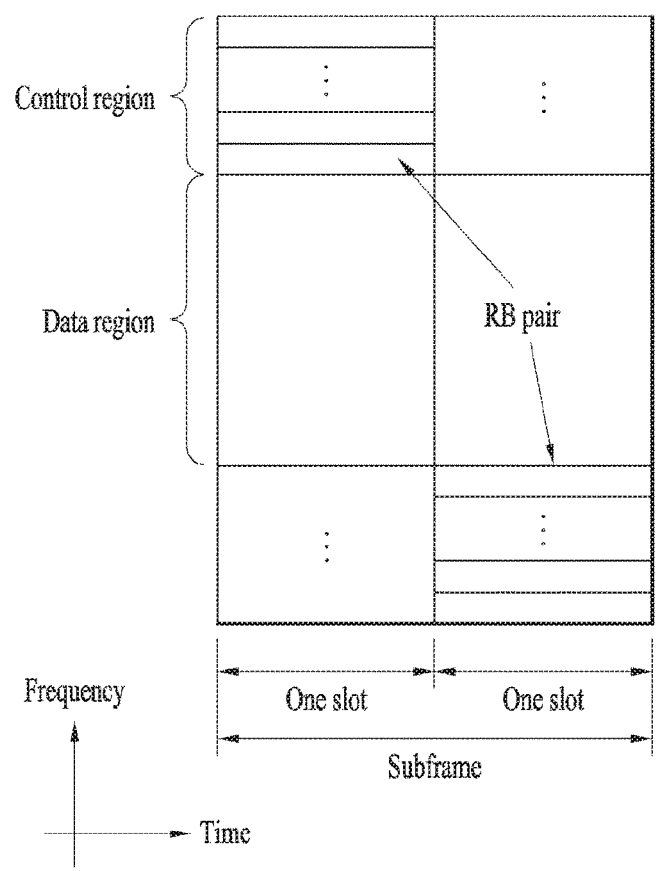
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
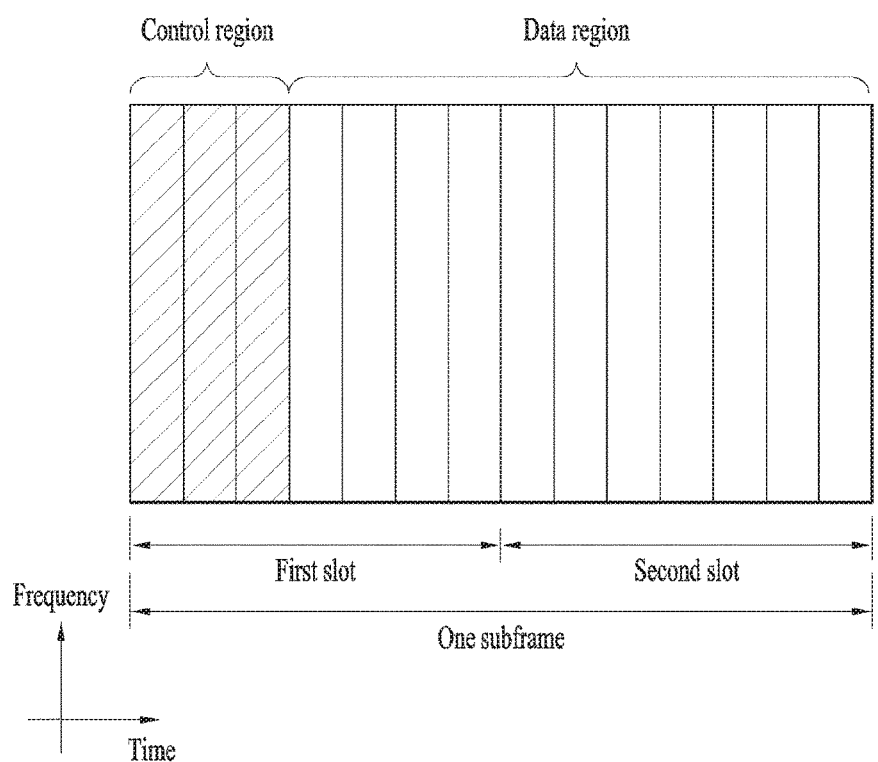
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and symbol using a correlation between antennas that form a massive antenna and apparatuses supporting the method.

1.2 CSI (Channel State Information) Feedback through PUCCH

First of all, in the 3GPP LTE system, when a DL reception entity (e.g., a user equipment) is connected to a DL transmission entity (e.g., a base station), the DL reception entity performs measurement on a reference signal received power (RSRP) of a reference signal transmitted in DL, a quality of a reference signal (RSRQ: reference signal received quality) and the like at a random time and is then able to make a periodic or even-triggered report of a corresponding measurement result to the base station.

Each user equipment reports a DL channel information in accordance with a DL channel status via uplink. A base station is then able to determine time/frequency resources, MCS (modulation and coding scheme) and the like appropriate for a data transmission to each user equipment using the DL channel information received from the each user equipment.

Such channel state information (CSI) may include CQI (Channel Quality Indication), PMI (Precoding Matrix Indicator), PTI (Precoder Type Indication) and/or RI (Rank Indication). In particular, the CSI may be transmitted entirely or partially depending on a transmission mode of each user equipment. CQI is determined based on a received signal quality of a user equipment, which may be generally determined on the basis of a measurement of a DL reference signal. In doing so, a CQI value actually delivered to a base station may correspond to an MCS capable of providing maximum performance by maintaining a block error rate (BLER) under 10% in the received signal quality measured by a user equipment.

This channel information reporting may be classified into a periodic report transmitted periodically and an aperiodic report transmitted in response to a request made by a base station.

In case of the aperiodic report, it is set for each user equipment by a 1-bit request bit (CQI request bit) contained in UL scheduling information downloaded to a user equipment by a base station. Having received this information, each user equipment is then able to deliver channel information to the base station via a physical uplink shared channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each user equipment by subframe unit and channel information in consideration of a transmission mode of each user equipment may be delivered to a base station via a physical uplink control channel (PUCCH) in accordance with a determined period. In case that data transmitted in uplink simultaneously exists in a subframe in which channel information is transmitted by a determined period, the corresponding channel information may be transmitted together with the data not on the physical uplink control channel (PUCCH) but on a physical uplink shared channel (PUSCH). In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 2 is provided to describe CSI feedback type transmitted on PUCCH and PUCCH CSI report mode.

accordance with a presence or non-presence of PMI transmission. In Table 11, No PMI corresponds to a case of open-loop (OL), transmit diversity (TD) and single-antenna, while Single PMI corresponds to a case of closed-loop (CL).

The mode 1-0 corresponds to a case that WB CQI is transmitted in the absence of PMI transmission. In this case, RI is transmitted only in case of open-loop (OL) spatial multiplexing (SM) and one WB CQI represented as 4 bits can be transmitted. If RI is greater than 1, CQI for a 1st codeword can be transmitted.

The mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB (wideband) spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set $\{-4, -3, -2, -1, 0, 1, 2, 3\}$ and can be represented as 3 bits.

The mode 2-0 corresponds to a case that CQI on a UE-selected band is transmitted in the absence of PMI transmission. In this case, RI is transmitted only in case of open-loop spatial multiplexing (SM) and a WB CQI represented as 4 bits may be transmitted. A best CQI (best-1) is transmitted on each bandwidth part (BP) and the best-1 CQI may be represented as 4 bits. And, an L-bit indicator indicating the best-1 may be transmitted together. If the RI is greater than 1, a CQI for a 1st codeword can be transmitted.

And, the mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each bandwidth part (BP) and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

TABLE 2

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI >1, CQI of first codeword | Mode 1-1<br>RI<br>Wideband CQI (4 bit)<br>Wideband spatial CQI (3 bit) for RI >1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator (L-bit label)<br>when RI >1, CQI of first codeword | Mode 2-1<br>RI<br>Wideband CQI (4 bit)<br>Wideband spatial CQI (3 bit) for RI >1<br>Wideband PMI (4 bit)<br>Best-1 CQI (4 bit) 1 in each BP<br>Best-1 spatial CQI (3 bit) for RI >1<br>Best-1 indicator (L-bit label) |

Referring to Table 2, in the periodic report of channel information, there are 4 kinds of reporting modes (mode 1-0, mode 1-2, mode 2-0 and mode 2-1) in accordance with CQI and PMI feedback types.

CQI can be classified into WB (wideband) CQI and SB (subband) CQI in accordance with CQI feedback type and PMI can be classified into No PMI or Single PMI in For the transmission modes, periodic PUCCH CSI report modes are supported as follows.

1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1

6) Transmission mode 6: Modes 1-1 and 2-1

7) Transmission mode 7: Modes 1-0 and 2-0

8) Transmission mode 8: Modes 1-1 and 2-1 if a user equipment is set to make a PMI/RI reporting, or Modes 1-0 and 2-0 if a user equipment is set not to make a PMI/RI reporting 9) Transmission mode 9: Modes 1-1 and 2-1 if a user equipment is set to make a PMI/RI reporting and the number of CSI-RS ports is greater than 1, or Modes 1-0 and 2-0 if a user equipment is set not to make a PMI/RI reporting and the number of CSI-RS port(s) is equal to 1.

The periodic PUCCH CSIU reporting mode in each serving cell is set by upper layer signaling. And, the mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a bandwidth part (BP) corresponding to a portion of a bandwidth of a serving cell. An index is given to the bandwidth part in a frequency increasing order starting with a lowest frequency without an increment of a bandwidth.

1.3 Reference Signal (RS)

Hereinafter, reference signals that can be used in the embodiments of the present invention will be described.

Figure 6:
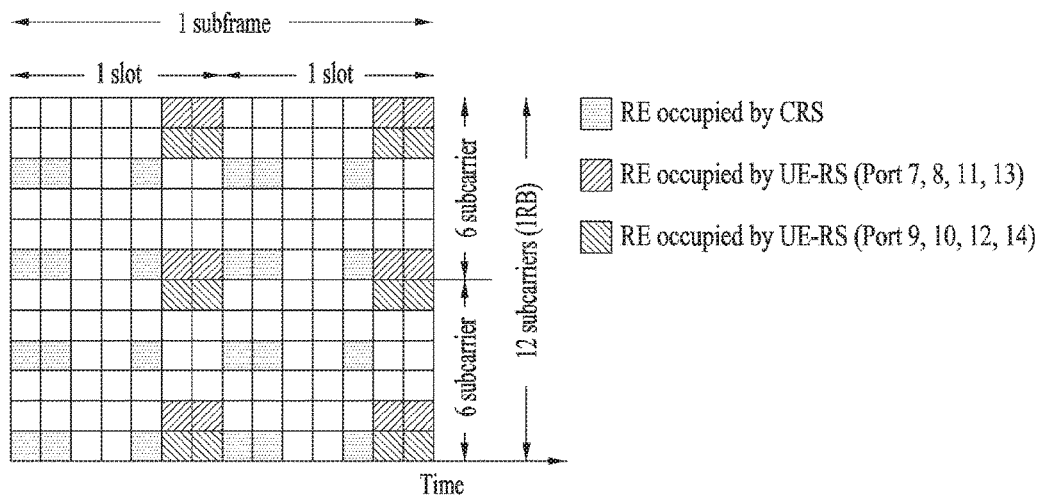
FIG. 6 is a diagram illustrating an exemplary subframe to which a UE-specific RS is allocated, which is usable in embodiments of the present invention.

FIG. 6 is a diagram illustrating an exemplary subframe to which a UE-specific RS is allocated, which is usable in embodiments of the present invention.

Referring to FIG. 6, the subframe includes REs occupied by a UE-RS among REs in an RB pair of a normal DL subframe having a normal CP.

The UE-RS is supported to transmit a PDSCH signal and may use antenna port(s) of p=5, p=7, p=8, or p=7, 8, . . . , v+6 (where v is the number of layers used for transmission of the PDSCH signal). The UE-RS is an RS which is present when transmission of the PDSCH signal is associated with a corresponding antenna port and is valid only for demodulation of the PDSCH signal.

The UE-RS is transmitted only in RBs to which the PDSCH signal is mapped. That is, as opposed to a Cell-specific Reference Signal (CRS) configured to be transmitted in every subframe regardless of presence/absence of the PDSCH, the UE-RS is configured to be transmitted only in RB(s) to which the PDSCH is mapped in a subframe in which the PDSCH is scheduled. In addition, the UE-RS is transmitted only through antenna port(s) corresponding respectively to layer(s) of the PDSCH, unlike the CRS transmitted through all antenna ports irrespective of the number of the layers of the PDSCH. Therefore, RS overhead can be reduced using the UE-RS relative to the CRS. For a detailed description of the CRS and the UE-RS, refer to TS 36.211 and 36.213 specifications of a 3GPP LTE-A system.

In 3GPP LTE-A system, the UE-RS is defined in a PRB pair. Referring to FIG. 6, in a PRB having a frequency-domain index of nPRB assigned for PDSCH transmission with respect to p=7, p=8, or p=7, 8, . . . , u+6, a part of UE-RS sequences is mapped to complex modulation symbols in a specific subframe The UE-RS is transmitted through antenna port(s) corresponding respectively to layer(s) of the PDSCH. That is, the number of UE-RS ports is proportional to a transmission rank of the PDSCH. Meanwhile, when the number of layers is 1 or 2, 12 REs per RB pair are used for UE-RS transmission and, when the number of layers is more than 2, 24 REs per RB pair are used for UE-RS transmission. In addition, the locations of REs occupied by the UE-RS (i.e., UE-RS REs) in an RB pair are equal with respect to each UE-RS port regardless of a UE or a cell.

As a result, the number of Demodulation Reference Signal (DM-RS) REs is equal in an RB to which the PDSCH for a specific UE is mapped in a specific subframe. It is noted that, in RBs assigned to different UEs in the same subframe, the number of DM-RS REs included in the RBs may differ according to the number of transmitted layers.

In embodiments of the present invention, UE-RS may have the same meaning as DM-RS.

2. LTE-U System 2.1 LTE-U System Configuration

Hereinafter, methods for transmitting and receiving data in a carrier aggregation environment of an LTE-A band corresponding to a licensed band and an unlicensed band will be described. In the embodiments of the present invention, an LTE-U system means an LTE system that supports such a CA status of a licensed band and an unlicensed band. A WiFi band or Bluetooth (BT) band may be used as the unlicensed band. An LTE-A system operating in the unlicensed band is referred to as Licensed Assisted Access (LAA) and LAA may represent a data transmission/reception scheme in the unlicensed band by a combination of the licensed band and the unlicensed band.

Figure 7:
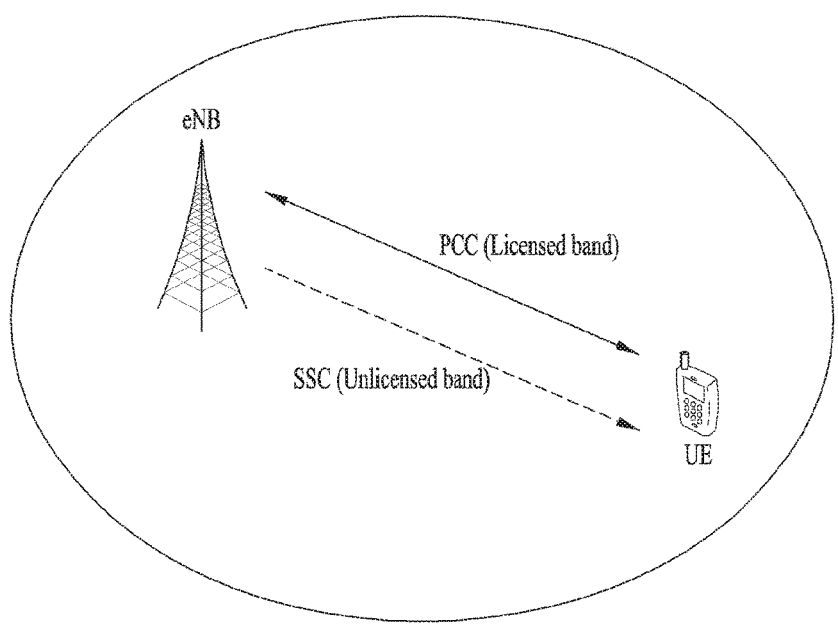
FIG. 7 illustrates an example of a CA environment supported in an LTE-U system.

FIG. 7 illustrates an example of a CA environment supported in an LTE-U system.

Hereinafter, for convenience of description, it is assumed that a UE is configured to perform wireless communication in each of a licensed band and an unlicensed band by using two component carriers (CCs). The methods which will be described hereinafter may be applied to even a case where three or more CCs are configured for a UE.

In the embodiments of the present invention, it is assumed that a Licensed CC (LCC) of the licensed band may be a primary CC (PCC or Pcell), and a Unlicensed CC (UCC) of the unlicensed band may be a secondary CC (SCC or Scell). However, the embodiments of the present invention may be applied to even a case where a plurality of licensed bands and a plurality of unlicensed bands are used in a carrier aggregation method. Also, the methods suggested in the present invention may be applied to even a 3GPP LTE system and another system.

In FIG. 7, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 7 is only example, and the embodiments of the present invention may be applied to even a CA environment that one UE accesses a plurality of eNBs.

For example, the UE may configure a macro eNB (M-eNB) and a Pcell, and may configure a small eNB (S-eNB) and an Scell. At this time, the macro eNB and the small eNB may be connected with each other through a backhaul network.

In the embodiments of the present invention, the unlicensed band may be operated in a contention-based random access method. At this time, the eNB that supports the unlicensed band may perform a carrier sensing (CS) procedure prior to data transmission and reception. The CS procedure determines whether a corresponding band is reserved by another entity.

For example, the eNB of the Scell checks whether a current channel is busy or idle. If it is determined that the corresponding band is idle state, the eNB may transmit a scheduling grant to the UE to allocate a resource through (E)PDCCH of the Pcell in case of a cross carrier scheduling mode and through PDCCH of the Scell in case of a self-scheduling mode, and may try data transmission and reception.

At this time, the eNB may configure a transmission opportunity (TxOP) period comprised of M consecutive subframes. In this case, a value of M and a use of the M subframes may previously be notified from the eNB to the UE through higher layer signaling through the Pcell or through a physical control channel or physical data channel.

2.2 Carrier Sensing (CS) Procedure

In embodiments of the present invention, a CS procedure may be referred to as a CCA procedure or a CAP. In the CA procedure, a determination may be made as to whether a channel is in a busy state or an idle state, based on a CCA threshold value which is preset or is set through a higher layer signal. For example, it may be determined that the channel is in the busy or idle state according to whether energy higher than the CCA threshold value is detected in an S cell which is an unlicensed band. If it is determined that the channel is in the idle state, an eNB may start to transmit a signal in the S cell. The above procedure may be referred to as LBT.

Figure 8:
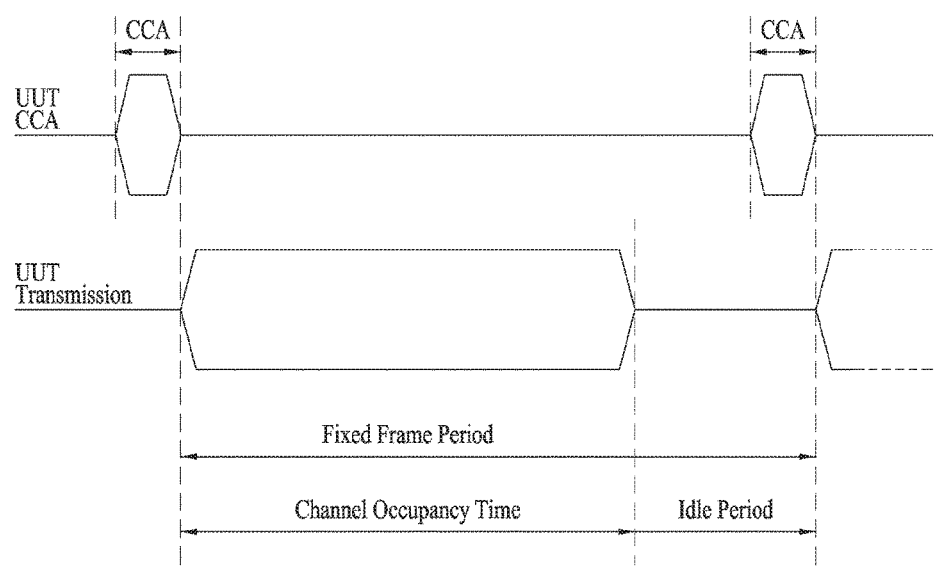
FIG. 8 is a diagram illustrating an exemplary FBE procedure which is a part of an LBT procedure.

FIG. 8 is a diagram illustrating an exemplary FBE operation which is a part of an LBT procedure.

Regulation (EN 301 893 V1.7.1) of the European Telecommunications Standards Institute (ETSI) discloses two operations of an LBT procedure, called a Frame Based Equipment (FBE) operation and a Load Based Equipment (LBE) operation. In the FBE operation, a channel occupancy time (e.g., 1 to 10 ms) indicating a time during which transmission can be maintained when a communication node succeeds in channel access and an idle period corresponding to a minimum of 5% of the channel occupancy time constitute one fixed frame. CCA is defined as an operation of monitoring a channel during a CCA slot (a minimum of 20 µs) of an end part in the idle period.

In this case, a communication node periodically performs CCA in units of fixed frames. When a channel is in an unoccupied state, the communication node transmits data during a channel occupancy time and, when the channel is in an occupied state, the communication node reserves transmission and waits until a CCA slot of the next period.

Figure 9:
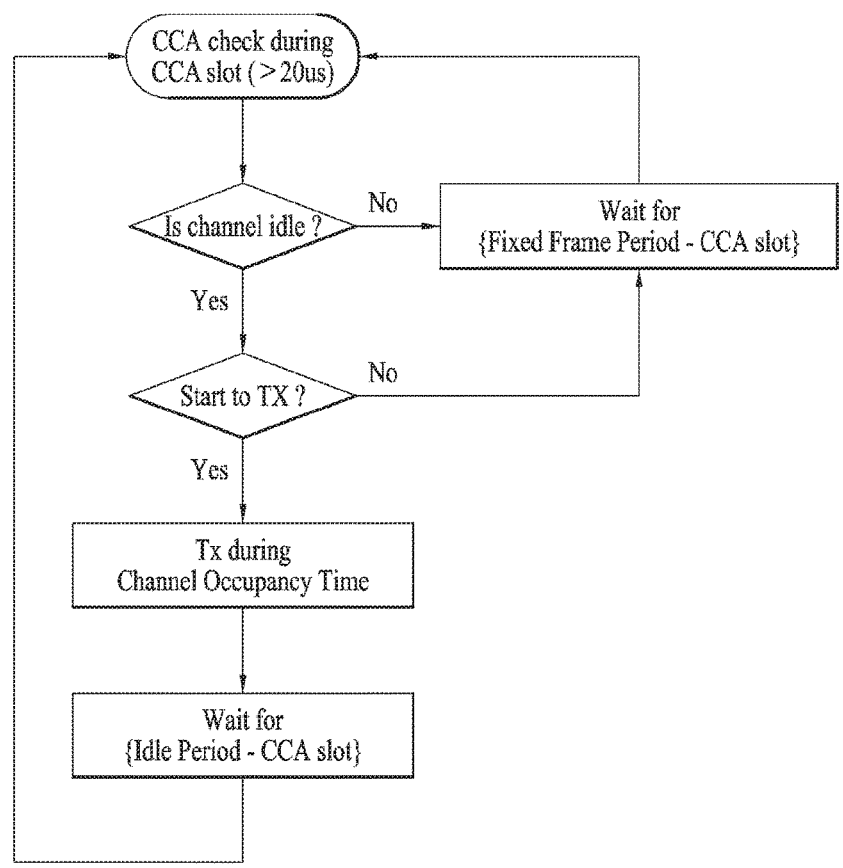
FIG. 9 is a diagram illustrating an FBE operation in a block form.

FIG. 9 is a diagram illustrating an FBE operation in a block form.

Referring to FIG. 9, a communication node (i.e., an eNB) managing an S cell performs a CCA procedure during a CCA slot. If a channel is in an idle state, the communication node starts to perform data transmission and, if the channel is in a busy state, the communication node waits for a time obtained by subtracting the CCA slot from a fixed frame period and then performs the CCA procedure again.

The communication node performs data transmission during a channel occupancy time and, if data transmission is ended, the communication node waits for a time obtained by subtracting the CCA slot from an idle period and then performs the CCA procedure again. If the channel is in the idle state or no data to be transmitted is present, the communication node waits for a time obtained by subtracting the CCA slot from a fixed frame period and then performs the CCA procedure again.

FIG. 10 is a diagram illustrating an LBE operation which is one part of an LBT procedure.

Referring to FIG. 10(a), in order to perform the LBE operation, a communication node sets a value of q{4, 5, . . . , 32} and then perform CCA for one CCA slot.

FIG. 10(b) is a diagram illustrating an LBE operation in a block form. The LBE operation will now be described with reference to FIG. 10(b).

A communication node may perform a CCA procedure in a CCA slot. If a channel is in an unoccupied state in the first CCA slot, the communication node may secure a time corresponding to a length of a maximum of ($13/32$)q ms to transmit data.

However, if the channel is in an occupied state in the first CCA slot, the communication node randomly selects a value of N□{1, 2, . . . , q} and sets a count value as an initial value and then stores the set count value. Next, the communication node senses a channel state in units of CCA slots. If the channel is in an unoccupied state in a specific CCA slot, the communication node decreases the set count value by 1. If the counter value becomes 0, the communication node may secure a time having a length of a maximum of ($13/32$)q ms and then transmit data.

2.3 Discontinuous Transmission in DL

Discontinuous transmission on an unlicensed carrier having a limited maximum transmission interval may affect some functions necessary for operation of an LTE system. These functions may be supported by one or more signals transmitted at a start part of discontinuous LAA DL transmission. The functions supported by such signals include AGC setting and channel reservation.

In signal transmission based on an LAA node, channel reservation refers to signal transmission through channels acquired to transmit a signal to other nodes after channel access through a successful LBT operation.

The functions supported by one or more signals for an LAA operation including discontinuous DL transmission include detection of LAA DL transmission by a UE and time/frequency synchronization functions of the UE. In this case, requirements of these functions do not exclude other possible functions and these functions may be supported by other methods.

2.3.1 Time and Frequency Synchronization

A design target recommended for an LAA system is to support a UE to acquire time and frequency synchronization acquisition through a discovery signal for Radio Resource Management (RRM) measurement, each of RSs included in DL Tx bursts, or a combination of the discovery signal and the RS. The discovery signal for RRM measurement transmitted in a serving cell is used to acquire coarse time or frequency synchronization.

2.3.2 DL Transmission Timing

In DL LAA design, subframe boundary adjustment may conform to a CA timing relationship between serving cells combined by CA defined in the LTE-A system (hereinafter, Rel-12). However, this does not always mean that an eNB starts DL transmission only at a subframe boundary. The LAA system may support PDSCH transmission even when all OFDM symbols in one subframe are not available according to a result of an LBT procedure. In this case, transmission of control information necessary for PDSCH transmission should be supported 2.4 RRM Measurement and Reporting The LTE-A system may transmit a discovery signal at a start point for supporting an RRM function including cell detection. In this case, the discovery signal may be referred to as a Discovery Reference Signal (DRS). To support RRM functions for LAA, the discovery signal of the LTE-A system and transmission and reception functions of the discovery signal may be changeably applied.

2.4.1 DRS

The DRS of the LTE-A system has been designed to support an on/off operation of a small cell. Small cells in an off state represent that most functions except for periodic DRS transmission are turned off. The DRS is transmitted at a DRS Tx occasion at a period of 40, 80, or 160 ms. Discovery Measurement Timing Configuration (DMTC) refers to a time duration during which a UE can expect to receive the DRS. The DRS Tx occasion may be generated anywhere in DMTC and the UE may expect that DRSs are continuously transmitted at a corresponding period by an assigned cell.

Using the DRS of the LTE-A system in an LAA system may cause new restrictions. For example, DRS transmission such as very short control signal transmission without LBT may be permitted in some regions, whereas short control signal transmission without LBT may not be permitted in some other regions. Therefore, DRS transmission in the LAA system may be a target of LBT.

If LBT is applied to DRS transmission, the DRS may not be transmitted in a periodic manner as in DRS transmission in the LTE-A system. Accordingly, the following two schemes may be considered for DRS transmission in the LAA system.

First, the DRS is transmitted only at a fixed time location in DMTC, based on LBT.

Second, DRS transmission is permitted at one or more different time locations in DMTC, based on LBT.

As another aspect of the second scheme, the number of time locations may be limited to one in one subframe. More usefully, DRS transmission out of DMTC may be permitted in addition to DRS transmission within DMTC.

Figure 11:
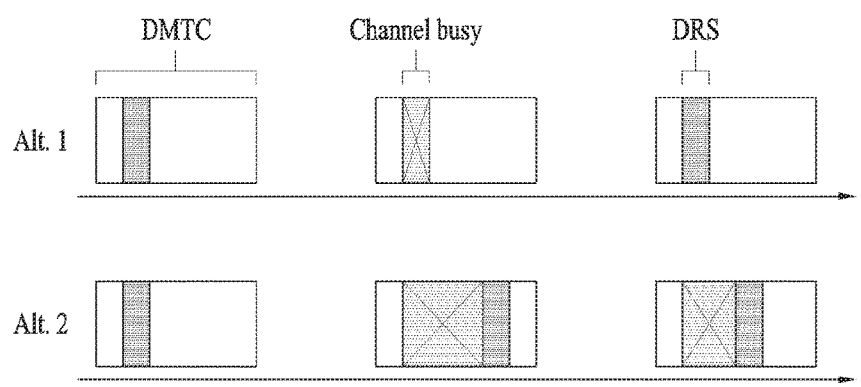
FIG. 11 is a diagram illustrating DRS transmission methods supported in an LAA system.

FIG. 11 is a diagram illustrating DRS transmission methods supported in an LAA system.

Referring to FIG. 11, an upper part of FIG. 11 illustrates the above first DRS transmission scheme and a lower part of FIG. 161 illustrates the above second DRS transmission scheme. That is, in the first scheme, a UE may receive the DRS only at a determined location in a DMTC duration and, in the second scheme, the UE may receive the DRS at a random location in the DMTC duration.

If the UE performs RRM measurement based on DRS transmission in the LTE-A system, the UE may perform one RRM measurement based on a plurality of DRS occasions. If the DRS is used in the LAA system, DRS transmission at a specific location cannot be guaranteed due to restriction of LBT. If the UE assumes that the DRS is present although the DRS is not actually transmitted by an eNB, quality of an RRM measurement result reported by the UE may deteriorate. Therefore, LAA DRS design should permit detection of presence of the DRS in one DRS occasion, thereby guaranteeing that the UE may combine only successfully detected DRS occasions with performed RRM measurement.

Signals including the DRS do not guarantee contiguous DRS transmissions in the time domain. That is, if there is no data transmission in subframes including the DRS, OFDM symbols on which a physical signal is not transmitted may be present. While a node performs operation in an unlicensed band, other nodes may sense that a corresponding channel in such a silent period between DRS transmissions is in an idle state. To avoid this problem, Tx bursts including the DRS are desirably configured as contiguous OFDM symbols on which a few signals are transmitted.

2.5 CAP (Channel Access Procedure) and Contention Window Adjustment Procedure Hereinafter, the above-described CAP and Contention Window Adjustment (CWA) will be described from the viewpoint of a transmission node.

Figure 12:
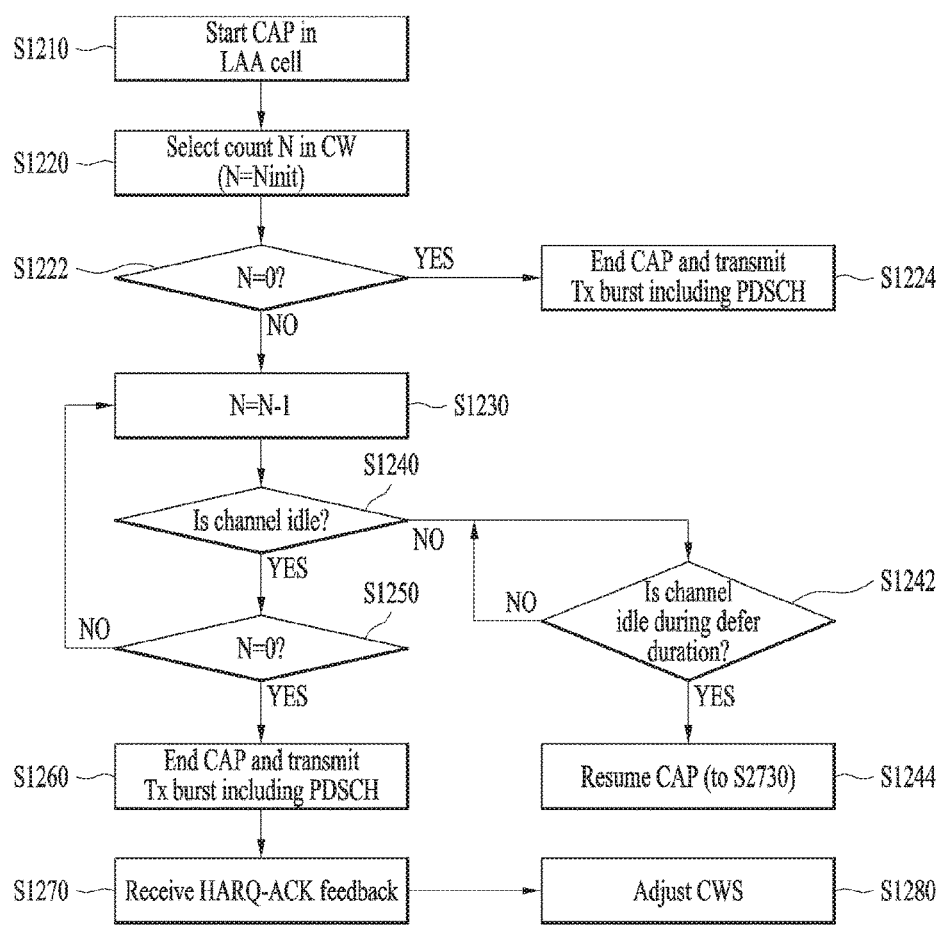
FIG. 12 is a diagram illustrating a CAP and CWA.

FIG. 12 is a diagram illustrating a CAP and CWA.

For DL transmission, an LTE transmission node (e.g., an eNB) may start a CAP in order to operate in LAA S cell(s) corresponding to unlicensed band cell(s) (S2710).

The eNB may randomly select a backoff count N in a Contention Window (CW). In this case, N may be set to an initial value Ninit (S1220). Ninit may be an arbitrary value between 0 between $CW_p$.

If the backoff count N is 0 (S1222), the eNB ends the CAP and transmits a Tx burst including a PDSCH (S1224). Meanwhile, if the backoff count is not 0, the eNB decreases the backoff count by 1 (S1230).

The eNB checks whether a channel of the LAA S cell(s) is in an idle state (S1240). If the channel is idle, the eNB checks whether the backoff count is 0 (S1250). The eNB repeatedly checks whether the channel is in the idle state while decreasing the backoff count by 1 until the backoff count becomes 0.

If the channel is not in the idle state in step S1240, that is, if the channel is in a busy state, the eNB checks whether the channel is in the idle state during a defer duration ($T_d$; 25 usec or more) longer than a slot time (e.g., 9 μsec) (S1242). If the channel is in the idle state during the defer duration, the eNB may resume the CAP (S1244). For example, if the backoff count Ninit is 10 and it is determined that the channel is in a busy state after the backoff count is decreased to 5, the eNB determines whether the channel is in the idle state by sensing the channel during the defer duration. In this case, if the channel is in the idle state during the defer duration, the eNB may perform the CAP again starting from the backoff count 5 (or 4 after decreasing the backoff count by 1) rather than setting the backoff count Ninit. On the other hand, if the channel is in the busy state during the defer duration, the eNB re-performs step S1242 to check again whether the channel is in the idle state during a new defer duration.

Referring again to FIG. 12, the eNB checks whether the backoff count N is 0 (S1250). If the backoff count is 0, the CAP is ended and a Tx burst including a PDSCH is transmitted (S1260).

The eNB may receive HARQ-ACK information for the Tx burst from the UE (S1270). The eNB may adjust a Contention Window Size (CWS) based on the received HARQ-ACK information (S1280).

As a method of adjusting the CWA in step S1280, the eNB may adjust the CWS based on HARQ-ACK information for the first subframe of the latest transmitted Tx burst (i.e., a start subframe of the Tx burst).

In this case, the eNB may set an initial CW for each priority class before performing the CWA. Next, if there is at least an 80% chance that an HACK-ACK value corresponding to a PDSCH transmitted in a reference subframe is determined to be NACK, the eNB increases set CW values for respective priority classes to respective permitted upper priority levels.

In step S1260, the PDSCH may be allocated by a self-carrier scheduling or cross-carrier scheduling scheme. If the PDSCH is assigned by the self-carrier scheduling scheme, the eNB counts DTX, NACK/DTX, and ANY states of the feedback HARQ-ACK information as NACK. If the PDSCH is assigned by the cross-carrier scheduling scheme, the eNB counts the NACK/DTX and ANY states of the feedback HARQ-ACK information as NACK and does not count the DTX state of the feedback HARQ-ACK information as NACK.

If HARQ-ACK information is bundled over M subframes (M>=2) and the bundled HARQ-ACK information is received, the eNB may regard the bundled HARQ-ACK information as M HARQ-ACK responses. In this case, it is desirable that M bundled subframes include a reference subframe.

3. Proposed Embodiment

As described above, in LAA, a method of deploying a plurality of carriers (or cells) in an unlicensed band has been discussed. In this case, a detailed LBT operation for the multiple carriers (or cells) (hereinafter multicarrier LBT) has also been discussed. If signal transmission can be performed only on partial carriers (i.e., if it is determined that a channel is idle only on partial carriers) after performing multicarrier LBT, the eNB includes precalculated (or preset) Tx power as reserved power with respect to carriers on which an additional signal is not transmitted. In this case, the eNB may allocate the reserved power to carriers on which an LBT operation is successfully performed and thus signal transmission can be performed.

For example, it is assumed that two CCs of CC1 and CC2 are present and the eNB prepares for signal transmission at a Tx power of $P_0$ on each CC. In this case, if signal transmission can be performed only on CC1 as a result of performing multicarrier LBT of the eNB, the eNB may allocate the Tx power $P_0$ calculated (or set) for CC2 to CC1, thereby performing signal transmission at a Tx power of $P_1=2*P_0$ on CC1.

As described above, dynamic change of Tx power by the eNB may affect CSI measurement by the UE. For example, a Tx power value may directly affect channel measurement when CSI measurement is performed or may indirectly affect interference measurement by cutting off signal transmission of a contiguous eNB or UEs in linkage with the LBT operation.

Therefore, the present invention proposes a method of restricting, in various ways, resources that the UE can use for the purpose of channel/interference measurement in consideration of dynamic Tx power change when the eNB can dynamically change Tx power.

Although operation in the LTE system will be described hereinbelow as a detailed embodiment of the present invention, operation of the present invention may be extended and applied to wireless communication systems performing the LBT operation. In addition, operation of the present invention described from the viewpoint of CSI measurement may be extended and applied to a channel estimation procedure for demodulation. An RS used for CSI measurement may differ according to a transmission mode. In other words, the UE may measure CSI using a CRS in a CRS based transmission mode and may measure CSI using a CSI-RS and/or CSI-Interference Measurement (IM) in a CSI-RS based transmission mode. In the present invention, "CSI measurement" or "CSI channel measurement" may simply represent "measurement of channel quality" or may represent "measurement of channel quality and interference".

Hereinafter, a detailed method proposed in the present invention will be described.

[Proposed method #1] When the UE performs channel measurement (or interference measurement) using N subframes in which a CRS/CSI-RS/CSI-IM is available at a timing corresponding to the CSI reference resource and timings prior thereto, one or more of the following criteria may be included as a criterion for determining whether a specific subframe is a subframe in which the CRS/CSI-RS/CSI-IM is available.

(1) A subframe in which it is determined through CRS (or CSI-RS) detection that DL transmission is present (2) A subframe in which it is scheduled to transmit (or set) the CRS/CSI-RS/CSI-IM through semi-static signaling (3) A subframe having index #0 or index #5

(4) A subframe within a predetermined time (or a predetermined number of subframes) from a subframe (or a CSI reporting time) indicated as the CSI reference resource.

Notably, the CSI reference resource represents the earliest time (that the eNB configures for the UE) at which the UE can use the CRS/CSI-RS/CSI-IM for CSI measurement.

In an LTE Rel-12 system, CSI measurement may be performed using the CRS/CSI-RS/CSI-IM resource available at an arbitrary timing according to UE implementation among a timing corresponding to the CSI reference resource and timings prior thereto. However, when Tx power is dynamically changed as in the present invention, if the UE averages channel measurements (or interference measurements) for subframes transmitted with different Tx power values, reliability is lowered because a final CSI measurement value reflects a boosting effect in temporal Tx power as well as actual channel and interference.

Accordingly, it is desirable that the UE perform CSI measurement and CSI feedback with respect to a TXP value known to the eNB. In this case, the eNB may apply TXP scaling to CSI through a derived TXP and modify the CSI to which TXP scaling is applied to CSI corresponding to a TXP to be allocated during later scheduling.

Accordingly, the present invention proposes a method of restricting subframes to perform CSI measurement or interference measurement in subframes having constant Tx power among a plurality of subframes for an LAA system in which Tx power is changed.

As in criteria proposed in (1), (2), (3), and (4) of [Proposed Method #1], subframes capable of using the CRS/CSI-RS/CSI-IM resource may be restricted to specific subframes in consideration of an LBT operation in LAA. If multiple criteria are applied among the above criteria, the UE may determine Ni subframes according to specific criteria and then select subframes in which CSI is to be measured using an actual CRS/CSI-RS/CSI-IM resource among the Ni subframes according to other criteria.

For example, if only criteria (1) and (2) of [Proposed Method #1] are considered, the UE determines Ni subframes based on the location of the CRS/CSI-RS/CSI-IM resource configured through a higher layer signal according to criterion (2) (at a timing corresponding to the CSI reference resource or a timing prior thereto). Next, if respective subframes in the Ni subframes satisfy criterion (1), the CRS/CSI-RS/CSI-IM resource in the corresponding subframes may be used for channel measurement (or interference measurement). If the subframes in the $N_1$ subframes do not satisfy criterion (1), the CRS/CSI-RS/CSI-IM resource in the corresponding subframes may not be used for channel measurement (or interference measurement).

[Proposed Method #2] An eNB informs a UE of Tx power information in a specific subframe (or a subframe in which the CRS/CSI-RS/CSI-IM resource is present) through explicit signaling or implicit indication and the UE restricts use of the CRS/CSI-RS/CSI-IM measurement resource based on the Tx power information as follows.

(1) The eNB presets a reference Tx power value and the UE performs channel measurement using the CRS/CSI-RS resource, wherein scaling for channel measurement is applied at the ratio (e.g., $P_0/P_1$) of the reference Tx power value (e.g., $P_0$) to a Tx power value in a corresponding subframe (e.g., $P_1$).

(2) The eNB presets the reference Tx power value (or the range of Tx power values) and the UE performs CSI measurement (i.e., channel measurement or interference measurement) using the CRS/CSI-RS/CSI-IM resource in subframes to which Tx power belonging to the reference Tx power value (or the range of Tx power values) is allocated.

In this case, the subframes using the CRS/CSI-RS/CSI-IM resource may be subframes in which the CRS/CSI-RS/CSI-IM resource is transmitted at a timing corresponding to the CSI reference resource or a timing prior thereto.

When the eNB performs Proportional Fairness (PF) scheduling, it is desirable that a fair channel state of the UE be checked by excluding an effect according to a dynamic variation of a Tx power value. To this end, the eNB may configure, for the UE, the reference Tx power to be referenced during CSI measurement and command the UE to scale a channel measurement value based on the reference Tx power through explicit signaling (or implicit indication) so that the UE may check Tx power in every subframe. In this case, interference measurement may be performed using subframes in which the CRS/CSI-IM resource is present according to UE implementation.

The UE may perform a scaling operation in the process of measuring CSI and apply the scaling operation to already measured CSI in the process of reporting the measured CSI to the eNB.

However, in the LAA system of the present invention, since the eNB performs an LBT operation, variation in Tx power by the eNB may change the number of contiguous cells recognizing a channel as a busy state, thereby indirectly affecting interference measurement. Therefore, the present invention proposes another method in which the eNB sets reference Tx power or a Tx power range and instructs the UE to perform channel measurement or interference measurement using the CRS/CSI-RS/CSI-IM resource in subframes to which Tx power belonging to the reference Tx power or the Tx power range is allocated.

When [Proposed Method #2] is applied, the UE may use an arbitrary subframe in which the CRS/CSI-RS/CSI-IM resource is present at a timing corresponding to the CSI reference resource or a timing prior thereto as subframes in which the UE is to perform CSI measurement. Alternatively, the subframe in which the UE is to perform CSI measurement may be restricted to a subframe in which the CRS/CSI-RS/CSI-IM resource is available according to one or more of criteria (1), (2), (3), and (4) of [Proposed Method #1] and a Tx power value or the range of Tx power values for the available subframe may be provided by applying [Proposed Method #2].

[Proposed Method #3] The eNB informs the UE of the (minimum) length of Tx bursts remaining in a specific subframe through explicit signaling (or implicit indication) and the UE restricts use of the CRS/CSI-RS/CSI-IM measurement resource based on information about the (minimum) length of the remaining Tx bursts as follows.

In this case, the UE updates, in every subframe, the information about the (minimum) length of the remaining Tx bursts indicated by the eNB and performs CSI measurement (i.e., channel measurement or interference measurement) using the CRS/CSI-RS/CSI-IM resources included in subframes within the (minimum) length of the remaining Tx bursts. The UE initializes CSI measurement at a timing after the (minimum) length of the remaining Tx bursts finally transmitted by the eNB.

In this case, the subframes using the CRS/CSI-RS/CSI-IM resource may be subframes in which the CRS/CSI-RS/CSI-IM resource is transmitted at a timing corresponding to the CSI reference resource or a timing prior thereto. In addition, the specific subframe may be randomly selected according to UE implementation.

In the LAA system, the eNB or UE may perform an LBT operation of determining whether a channel is in a busy or idle state based on a specific energy threshold and then transmit a Tx burst including a series of signals upon successful channel access. In this case, the energy threshold needs to be adjusted in consideration of coverage of an entity performing the LBT operation. As an example, in the case of wide coverage due to high Tx power, the energy threshold may be set to be low so that the UE may perform the LBT operation for wide coverage by setting the energy threshold to be low. Similarly, upon transmitting the Tx burst after succeeding in the LBT operation using the set energy threshold based on a specific Tx power (e.g., $P_0$), it is not desirable that the eNB or the UE apply Tx power higher than Tx power (e.g., $P_1 > P_0$) assumed in the LBT operation. Accordingly, Tx power may be kept constant within a constant Tx burst as a desirable example. In this case, an averaging operation for CSI measurement may be performed within a Tx burst which is a minimum duration during which Tx power is uniformly ensured.

In this case, the averaging operation may include configuration in which the UE performs CSI measurement by applying time-axis filtering.

In this way, if the eNB informs the UE of the (minimum) length of the remaining Tx burst starting from a specific subframe as additional information related to the Tx burst, the UE may perform CSI measurement using the CRS/CSI-RS/CSI-IM resource within the (minimum) length of the remaining Tx burst starting from the specific subframe. Since the same Tx power is not ensured at a timing after the (minimum) length of the remaining Tx burst based on the specific subframe, the UE may initialize CSI measurement.

[Proposed Method #4] The eNB informs the UE of a Tx burst sequence (or Tx power sequence) in a specific subframe through explicit signaling (or implicit indication) and the UE restricts use of the CRS/CSI-RS/CSI-IM measurement resource based on the Tx burst sequence (or Tx power sequence) as follows.

In this case, the UE performs CSI measurement using the CRS/CSI-RS/CSI-IM resource in subframes having the same Tx burst sequence (or Tx power sequence) and initializes CSI measurement when the Tx burst sequence (or Tx power sequence) is changed or is not detected (during one subframe or consecutive subframes of a predetermined number).

Here, a subframe using the CRS/CSI-RS/CSI-IM resource may be a subframe in which the CRS/CSI-RS/CSI-IM resource is transmitted at a timing corresponding to the CSI reference resource or a time point prior thereto. The Tx burst sequence may be set to have the same value with respect to consecutive subframes belonging to the same Tx burst and the Tx power sequence may be set to have the same value with respect to (transmitted) subframes in a time duration during which Tx power is not changed.

Similarly to [Proposed Method #3], [Proposed Method #4] proposes a method in which the UE performs CSI measurement in units of Tx bursts under the assumption that Tx power is maintained in the same Tx burst. The difference with [Proposed Method #3] is that the eNB [Proposed Method #4] allocates the Tx burst sequence to the UE so that the UE receiving the Tx burst sequence may recognize the Tx burst.

As an example, the eNB may inform the UE of the Tx burst sequence represented as 0 or 1 using a 1-bit indicator with respect to a series of Tx bursts or subframes to which the Tx bursts are allocated. Specifically, the eNB may provide Tx burst sequence information of the 1-bit indicator to the UE by allocating the information to each subframe.

Figure 13:
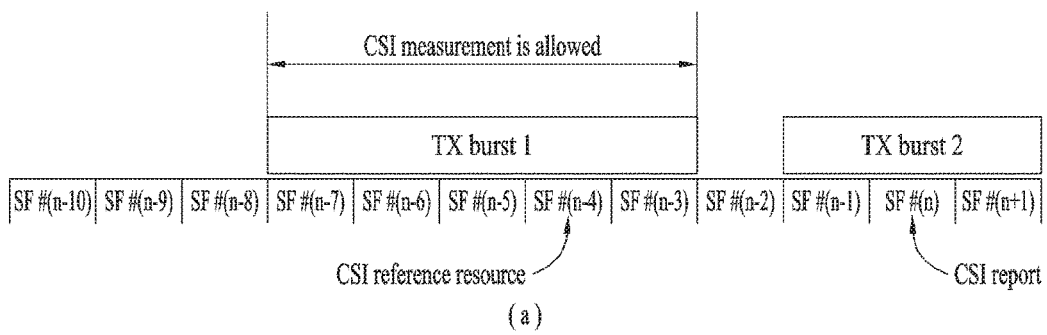
FIG. 13 is a diagram illustrating an exemplary transmission burst sequence according to an embodiment of the present invention.

As illustrated in FIG. 13a, if a Tx burst including 4 subframes, a Tx burst including one subframe, and a Tx burst including two subframes are continuously present in time order starting from subframe #n to subframe #(n+6), a Tx burst sequence in each subframe may be represented as '0, 0, 0, 0, 1, 0, 0'. In other words, if a Tx burst in a specific subframe is different from a Tx burst present in a subframe immediately before the specific subframe, the Tx burst sequence for the specific subframe may be toggled.

Upon failing to detect a Tx burst sequence for the Tx burst including one subframe, the UE may detect '0, 0, 0, 0, X, 0, 0'. In this case, the UE cannot discern whether the Tx bursts transmitted before/after the sequence that the UE fails to detect are the same or different. Therefore, the UE should initialize CSI measurement in a subframe in which the UE fails to detect the Tx burst sequence.

As another example, as illustrated in FIG.13b, a Tx burst sequence (or Tx power sequence) may indicate a plurality of states and, therefore, the Tx burst sequence may include bit information of more than one bit. If a criterion for initializing CSI measurement corresponds to the case in which the number of consecutive subframes in which the Tx burst sequence (or Tx power sequence) is not detected is X, then X may differ according to the number of bits indicating the Tx burstsequence (or Tx power sequence) and a minimum length of Tx bursts. For example, if the Tx burst sequence Is indicated by a 2-bit indicator and a Tx burst including 4 subframes, a Tx burst including one subframe, and a Tx burst including two subframes are continuously present as in FIG. 13a, the Tx burst sequence may be represented as '0, 0, 0, 0, 1, 2, 2'. That is, if a Tx burst of an N-th subframe and a Tx burst of an (N+1)-th subframe are distinguished, Tx burst sequence information regarding the (N+1)-th subframe may Indicate the next state of Tx burst sequence information regarding the N-th subframe.

In this case, even if the UE fails to detect a Tx burst sequence including one subframe, since the UE can detect a Tx burst sequence such as '0, 0, 0, 0, X, 2, 2', the UE may distinguish a Tx burst for each of 7 subframes.

However, if a minimum length of Tx bursts is one subframe and the UE fails to detect a Tx burst sequence for three consecutive subframes, the UE may detect a Tx burst sequence such as '0, X, X, X, 0'. In this case, the UE may have a difficulty in discerning whether a Tx burst sequence transmitted by the eNB is '0, 0, 0, 0, 0' or '0, 1, 2, 3, 0'. In this case, the UE may initialize CSI measurement upon failing to detect the Tx burst sequence for three consecutive subframes.

[Proposed Method #5] Upon performing interference measurement, the UE may use measurement values only in a given interference range having an upper or lower value based on a specific reference value as follows.

(1) An average interference measured during a predetermined time (or a predetermined number or more of samples)

(2) An average interference measured in subframes with reference Tx power (3) A power value set by the eNB through a higher layer signal (4) An average interference measured from a DRS of a contiguous cell Here, the upper or lower value may be set by the eNB through the higher layer signal.

An effect according to variation of Tx power in interference measurement is indirect and is less sensitive. Therefore, even if restriction of CSI measurement according to Tx power is not strict, interference measurement may not be greatly influenced. Accordingly, restriction of CSI measurement according to Tx power may be relieved with respect to interference measurement so that the UE desirably monitors more measurement resources. As an example, the UE may freely use a CRS or CSI-IM resource to perform interference measurement according to an implementation method as in a legacy LTE system. Furthermore, the eNB may configure an interference range for the UE to consider only interference measured in the interference range for CSI measurement.

[Proposed Method #6] If the eNB informs the UE that a specific subframe is an ending partial subframe, the UE may restrict use of the CRS/CSI-RS/CSI-IM measurement resource based on a determination as to whether each subframe is the ending partial subframe as follows.

In this case, the UE may use only the CRS/CSI-RS/CSI-IM measurement resource in N OFDM symbols of a front part in a corresponding subframe with respect to the ending partial subframe and the number N of OFDM symbols may be defined as follows.

(1) A prefixed value (e.g., ½ OFDM symbols or the first slot (=7 OFDM symbols))

(2) A value set by the eNB through a higher layer signal

Here, the ending partial subframe may represent a subframe in which PDSCH transmission is not performed on partial OFDM symbols of a rear part in one subframe.

The LAA system supports an ending partial subframe structure in which a Tx burst is not transmitted in OFDM symbols of a rear part (in time) among OFDM symbols included in a subframe, for consecutive transmission of Tx bursts. For example, if a specific subframe is the ending partial subframe, the eNB or the UE may transmit a Tx burst only using a few OFDM symbols located in a front part (in time) among OFDM symbols included in the specific subframe. The ending partial subframe may provide an LBT execution time to transmit a subsequent Tx burst when consecutive Tx bursts are present.

To reduce common signaling overhead, the eNB may inform only UEs receiving data transmission of an accurate length of the ending partial subframe and may inform UEs performing only CSI measurement of whether a specific subframe is the ending partial subframe. In this case, a UE performing CSI measurement should be aware of information about a minimum resource region in which the CRS/CSI-RS/CSI-IM measurement resource is guaranteed. According to the present invention, when the eNB informs a UE of whether a specific subframe is the ending partial subframe, the UE may perform CSI measurement using only the CRS/CSI-RS/CSI-IM measurement resource in N OFDM symbols of a front part which are prescheduled with respect to the ending partial subframe or preset by the eNB.

[Proposed Method #7] When the eNB can independently configure Tx power for a subframe in which a DRS is transmitted, the UE performs CSI measurement using the DRS or the CRS/CSI-RS/CSI-IM resource in a Tx burst including the DRS.

The LAA system is configured such that the UE assumes that Tx power of the DRS or a Tx burst including the DRS is identically configured for RRM measurement. Desirably, the eNB may expect that DRSs or Tx bursts including the DRSs are transmitted at the same Tx power and the UE may perform CSI measurement (i.e., channel measurement or interference measurement) using the CRS/CSI-RS/CSI-IM resource in the DRS or the Tx bursts including the DRSs.

[Proposed Method #8] When the eNB can independently configure Tx power with respect to a subframe in which the DRS is transmitted, the eNB applies a virtual subframe index (or slot index) (e.g., a value not included in {0, 1, ..., 19}), which is not used for PDSCH transmission, as one of seed values upon generating a sequence for a CRS/CSI-RS/PSS/SSS included in the DRS and the UE applies the CRS/CSI-RS/PSS/SSS to CSI measurement upon detecting the CRS/CSI-RS/PSS/SSS generated based on the virtual subframe index (or slot index) as follows.

In this case, the UE may perform CSI measurement (i.e., channel measurement or interference measurement) using CRS/CSI-RS/CSI-IM resource information which is pre-scheduled or preset with respect to a subframe in which the DRS is transmitted and the CRS/CSI-RS/CSI-IM resource information may include one or more of the following items.

of RSs included in the DRS conform to a restricted subframe index (e.g., subframe index #0 or #5) has been discussed in order to relieve blind decoding for DRS transmission. The above characteristics mean that information about RE mapping of the CRS/CSI-RS/CSI-IM resource capable of being used by the UE with respect to a subframe in which the DRS is transmitted, antenna ports, and Tx power can be greatly different from a normal subframe.

Therefore, the present invention proposes a method in which a sequence of specific RSs included in the DRS conforms to a limited subframe index and a virtual subframe index rather than a subframe index used in a legacy PDSCH is configured so as to discern whether a corresponding subframe is a subframe in which the DRS is transmitted by detecting an RS having the virtual subframe index as a seed. As an example, a procedure of generating a CRS sequence using a virtual slot index according to the proposed operation of the present invention will be described hereinbelow. In the LTE system, the CRS sequence may be generated as in Table 3.

TABLE 3

6.10.1.1 Sequence generation

The reference-signal sequencer $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)), m = 0, 1, \ldots, 2N_{RB}^{max,DL} - 1$$

where $n_s$ is the slot number within a radio frame and l is the OFDM symbol number within the slot. The pseudo-random sequence c(i) is defined in clause 7.2. The pseudo-random sequence generator shall be initialised with $c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$ at the start of each OFDM symbol where $$N_{CP} = \begin{cases} 1 & \text{for normal CP} \\ 0 & \text{for extended CP} \end{cases}$$

(1) The number of antenna ports for the CRS/CSI-RS/CSI-IM resource (2) Tx power for the CRS/CSI-RS/CSI-IM resource (3) RE mapping to the CRS/CSI-RS/CSI-IM resource In this case, the virtual subframe index (or slot index) may be applied only when the DRS is transmitted without a PDSCH. That is, if the DRS is transmitted together with the PDSCH when a sequence of RSs included in the DRS is generated, a subframe index (or slot index) is applied as one of the seed values and, if the DRS is transmitted without the PDSCH, the virtual subframe index may be generated regardless of the subframe index. For example, if the DRS is transmitted without the PDSCH, the virtual subframe index (or slot index) may be applied as one of the seed values of RSs included in the DRS.

As described above, the eNB may dynamically change Tx power in consideration of an operation such as multicarrier LBT. However, if the eNB transmits the DRS, Tx power for a corresponding subframe may be fixed in consideration of RRM measurement. In this case, if information as to whether a current subframe in which the UE performs CSI measurement is a subframe in which the DRS is transmitted is not transmitted to the UE through additional signaling, the case in which use of a CSI-RS resource becomes ambiguous may occur by DRS design that is specific to the LAA system. As an example, in the case of a subframe in which the DRS is transmitted in the LAA system, two rear OFDM symbols are designed to be empty as a space for performing LBT for other DRS transmission and a method in which a sequence In this case, ns is a slot number and is typically included in $n_s \square \{0, 1, 2, \ldots, 18, 19\}$. In the present invention, the eNB configures $n_{DRS}$ which is a virtual slot index for the UE and the UE may generate a seed value for generating the CRS sequence using nDRs as follows.

$$c_{init} = 2^{10} \cdot (7 \cdot (n_{DRS}+1)+l+1) \cdot (2 \cdot N_{ID}^{cell}+1)+2 \cdot N_{ID}^{cell}+ N_{CP} \quad \text{[Equation 4]}$$

In this case, nDRs is not included in {0, 1, 2, ..., 18, 19}. Next, the UE may attempt to detect a CRS sequence conforming to a subframe index (or slot index) for every DL subframe and, if the CRS sequence is not detected, the UE may attempt to detect a CRS sequence conforming to the virtual subframe index (or slot index) $n_{DRS}$. Thereby, the UE may determine that the DRS has been transmitted only when the CRS sequence conforming to nDRs is detected. In this case, the CRS/CSI-RS/CSI-IM resource information corresponding to a subframe in which the DRS is transmitted may be additionally configured for the UE by the eNB and the UE may use the information for CSI measurement for the subframe in which the DRS is transmitted.

The above configuration may be applied together with [Proposed Method #3] and/or [Proposed Method #4] of the present invention. Upon detecting the DRS transmitted without the PDSCH in a specific subframe, the UE may initialize CSI measurement.

[Proposed Method #9] When the eNB can independently configure Tx power with respect to a subframe in which the DRS is transmitted, the eNB uses a DRS dedicated sequence, which is not used for PDSCH transmission, upon generating a sequence for the CRS/CSI-RS/PSS/SSS included in the DRS and the UE uses the CRS/CSI-RS/PSS/SSS for CSI measurement upon detecting the DRS dedicated sequence.

In this case, the UE performs CSI measurement (i.e., channel measurement or interference measurement) using CRS/CSI-RS/CSI-IM resource information which is pre-scheduled or preset with respect to the subframe in which the DRS is transmitted and the CRS/CSI-RS/CSI-IM resource information may include one or more of the following items.

(1) The number of antenna ports for the CRS/CSI-RS/CSI-IM resource (2) Tx power for the CRS/CSI-RS/CSI-IM resource (3) RE mapping for the CRS/CSI-RS/CSI-IM resource In this case, the DRS dedicated sequence may be applied when the DRS is transmitted without the PDSCH.

In [Proposed Method #9], a method of generally expanding [Proposed Method #8] is proposed. When only the DRS is transmitted in a subframe or when the DRS and the PDSCH are multiplexed and transmitted, a sequence of the CRS/CSI-RS/PSS/SSS transmitted in the corresponding subframe is not included in a sequence set which is applicable to transmission of the CRS/CSI-RS/PSS/SSS in a subframe in which only the PDSCH is transmitted. In other words, the present invention proposes a method of applying the DRS dedicated sequence. Various methods may be applied to generate the DRS dedicated sequence. For example, [Proposed Method #8] may be applied or an offset value of the DRS dedicated sequence may be added to $c_{init}$ which is a seed value for the sequence of Table 3.

[Proposed Method #10] When the eNB informs the UE of Tx power in a specific subframe through explicit signaling (or implicit indication), the eNB configures information about a potential subframe in which the explicit signaling (or implicit indication) may exist through a higher layer signal and the UE assumes that information of the explicit signaling (or implicit indication) is maintained until the next potential subframe (or that the information is maintained for a predetermined time after receiving the signaling).

Upon not receiving explicit signaling (or implicit indication) in the potential subframe, the UE may perform the following operations.

(1) The UE does not perform CSI measurement unit the next potential subframe.

(2) The UE performs CSI measurement using only a CSI measurement resource in a subframe scheduled with the eNB.

(3) The UE assumes information about latest received explicit signaling (or implicit indication)

(4) The UE assumes at least one of the following Tx power values

A. A Tx power value prescheduled with the eNB

B. A minimum Tx power value that can be configured by the eNB

C. A maximum Tx power value that can be configured by the eNB

Although the eNB may inform the UE of Tx power in every subframe as in [Proposed Method #2], the eNB may inform the UE of Tx power through explicit signaling (or implicit signaling) only in a specific subframe in order to reduce burden imposed on the UE. Upon receiving the explicit signaling (or implicit signaling), the UE may assume that Tx power indicated by signaling received before next signaling is maintained. In consideration of detection failure for explicit signaling (or implicit signaling), the UE may assume that Tx power indicated through signaling is maintained for a predetermined time after explicit signaling (or implicit signaling) for the Tx power is received.

Upon not receiving explicit signaling (or implicit signaling) for Tx power in a scheduled subframe, the UE may not perform CSI measurement or perform CSI measurement of a limited form because the UE has no information about Tx power. The CSI measurement of a limited form may indicate CSI measurement only in a specific subframe indicated by the eNB through aperiodic CSI triggering.

[Proposed Method #11] The UE assumes that the same Tx power (absolute power configured through RRC signaling or Tx power designated by a power offset for other signals) is semi-statically applied to signals (a CRS, a CSI-RS for RRM, and a PSS/SSS) used for RRM measurement (or RSRP or RSRQ measurement) in different subframes with respect to subframes satisfying at least one of the following criteria.

(1) A subframe having a specific subframe index (in a DMTC duration) (more specifically, a subframe having index #0 or #5). Desirably, a subframe in which the PSS/SSS or the CRS on four symbols is detected from among subframe indexes #0 and #5 (this scheme may be applied even out of the DMTC duration)

(2) A subframe in which the CRS or the PSS/SSS is detected (in the DMTC duration)

(3) A subframe in which the CRS or the PSS/SSS is first detected (in the DMTC duration)

(4) A subframe in which a CRS/CSI-RS to which a scrambling sequence that does not conform to a subframe index (in the DMTC duration) is applied is detected (5) A subframe in which the CRS or the PSS/SSS is first detected (in the DMTC duration) when the CSI-RS is configured to be included in the DRS (6) A subframe in which the CSI-RS is detected (in the DMTC duration) when the CSI-RS is configured to be included in the DRS (7) All subframes in the DMTC duration In the above schemes, when the CRS is used as a criterion, subframes may be limited to the case in which the CRS is detected on all of four OFDM symbols.

However, in a subframe having index #0 or #5, it may be assumed that the same Tx power is applied for the purpose of RRM (or RSRP or RSRQ measurement) out of the DMTC duration as well.

As described previously, in the LAA system proposed in the present invention, the eNB may dynamically change Tx power for every Tx burst and the UE assumes that the same Tx power is maintained only in subframes in the Tx burst as a basic operation. Exceptionally, the UE may assume that the same Tx power is applied even with respect to subframes in which RSRP or RSRQ measurement is to be performed for RRM.

In the LAA system, the UE may perform RSRP or RSRQ measurement using the DRS that can be configured by the CRS, PSS/SSS, or CSI-RS. In terms of Tx power, the UE may assume that the same Tx power is applied to subframes in which the DRS is transmitted. In this case, an arbitrary DRS always includes the CRS and the PSS/SSS. However, whether the DRS includes the CSI-RS may be configured by the eNB for the UE through a higher layer signal.

In the LAA system proposed in the present invention, the CRS and the PSS/SSS may always be transmitted in subframes having indexes #0 and #5 in order to maintain synchronization. In this case, CRS and PSS/SSS transmission for the DRS may not be distinguished from CRS and PSS/SSS transmission for synchronization. In particular, when the CRS and PSS/SSS are transmitted in a subframe having index #0 in the DMTC duration, the UE cannot discern whether the CRS and PSS/SSS are transmitted for the DRS or for synchronization rather than the DRS. In consideration of such ambiguity, a method of defining subframes in which the UE assumes that Tx power for RRM measurement (or RSRP or RSRQ measurement) is the same will be proposed hereinbelow.

Since the UE cannot discern whether the CRS and the PSS/SSS are transmitted for the DRS or for synchronization in a subframe having index #0 or #5, the UE may assume that the same Tx power is applied for the purpose of RRM with respect to all subframes in which the CRS and PSS/SSS are transmitted. In this case, since the UE expects that the DRS is transmitted in the DMTC duration, more precisely, the UE may assume that the same Tx power is applied to all subframes in which the CRS and PSS/SSS are detected in the DMTC duration.

Alternatively, the criteria proposed in [Proposed Method #11] may be used for the UE to distinguish between subframes in which the UE assumes that the DRS has been transmitted or is to be transmitted.

3.1 Additional Embodiment

In the following, CSI channel measurement may mean channel quality only or both channel quality and interference.

For CSI report in the subframe n, CSI reference resource in time domain is defined as the subframe n–Y.

The Subframe n–Y is latest subframe which belongs to latest transmission burst which start no later than the subframe n–X while satisfying Y≥X (e.g. X=4). This is equivalent with that, the subframe n–Y is latest (valid) subframe within a latest transmission burst which satisfies Y≥X. Or more precisely, the subframe n–Y is latest (valid) subframe which satisfies Y≥X within a latest transmission burst which start no later than the subframe n–X.

In addition to the existing definition of valid subframe, Initial partial subframe (may be only for CSI-RS based measurement) and/or end partial subframe (may be only for CSI-RS based measurement) and/or subframe (only) with reservation signal are not valid subframe:

Initial partial subframe: first subframe which doesn't start from the first OFDM symbol of the first subframe within a transmission burst End partial subframe: last subframe which doesn't end at the last OFDM symbol (or which ends before a certain OFDM symbol, e.g. before 13th OFDM symbol) of the last subframe within a transmission burst Reservation signal: signal prior to the start of normal subframes (including initial partial subframe) within a transmission burst to occupy channel or for synchronization, In another way, the subframe n–Y (Y≥X) can be considered as valid CSI reference resource not considering the eNB's TX burst transmission. Then, UE assumes transmit power in the TX burst which satisfies the above condition in calculating CSI.

For CSI report in the subframe n, the UE's CSI channel measurement is restricted within the transmission burst to which the CSI reference resource belongs. Or, the UE should do CSI channel measurement in the subframe n–Y (and may perform in other subframe in the transmission burst as well if it can reliably identify subframes belonging to a same TX burst). This equivalently means that the UE can assume QCL (quasi-collocation) of the reference signals for CSI measurement is achieved within that transmission burst but cannot assume QCL with other transmission bursts.

Even though legacy LTE system doesn't allow for a UE configured with CRS based transmission mode to measure CSI in MBSFN subframe or to regards MBSFN subframe as valid subframe either, in LAA, the UE configured with CRS based transmission mode can measure CSI in MBSFN subframe or regard MBSFN subframe as valid subframe for CSI calculation since LAA system bandwidth is larger than or around 5 MHz and there are enough CRS REs in the first a few OFDM symbols in a MBSFN.

Figure 14:
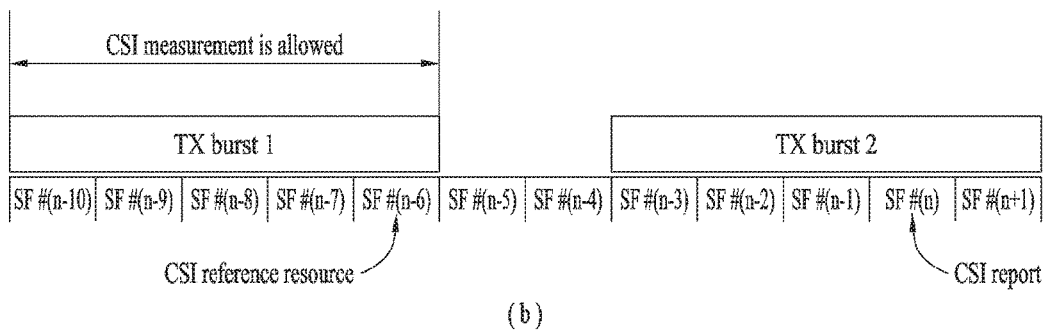
FIG. 14 illustrates a timing of a CSI reference resource when a CSI reporting timing is subframe n and X=4.

FIG. 14 illustrates a timing of a CSI reference resource when a CSI reporting timing is subframe n and X=4.

For example, as illustrated in FIG. 14a, when the UE reports CSI in subframe #n, subframe #n–4 may be included in subframes in which a first Tx burst (Tx burst 1) is transmitted. In this case, the UE may perform CSI measurement using a CSI reference resource included in subframe #n–4 and perform CSI measurement with respect to subframes in which the first transmission burst is transmitted.

As another example, as illustrated in FIG. 14b, when the UE reports the CSI in subframe #n, subframe #n–4 may not be included in subframes in which a specific Tx burst is transmitted. In this case, the UE may perform CSI measurement using a CSI reference resource of subframe #n–6 which is the last subframe in which the first Tx burst is transmitted among subframes prior to subframe #n–4. Then, the UE may perform CSI measurement in subframes in which the first Tx burst is transmitted using the CSI reference resource of subframe #n–6.

If subframe #n–6 is a non-valid subframe (e.g., a starting partial subframe, an ending partial subframe, or a subframe for transmitting a reservation signal), the UE may perform CSI measurement using a CSI reference resource of subframe #n–7 immediately before subframe #n–6.

On the other hand, if we consider that the UE configured with CSI measurement using CSI-RS cannot actually measure CSI by CSI-RS within a transmission burst which doesn't contains any subframe where periodic CSI-RS is configured. To solve this case, the invention above can be modified as below, which can be applied to the UE which is configured with CSI measurement using CRS as well for simplicity of UE implementation and system management. In the following, the CSI-RS may mean periodic CSI-RS or aperiodic CSI-RS configured for CSI measurement.

(1) For CSI report in a subframe n, CSI reference resource in time domain is defined as a subframe n–Y.

In case of CRS based Transmission Mode:

Option 1: the subframe n–Y is latest subframe which belongs to latest transmission burst and the latest transmission burst contains CRS (within a full SF and/or non-MBSFN SF) which starts no later than a subframe n–X.

Option 2: the subframe n–Y is latest subframe which belongs to latest transmission burst and the latest transmission burst contains CRS (within a full SF and/or non-MBSFN SF) which starts no later than the subframe n–X while satisfying Y≥X (e.g. X=4).

Option 3: the subframe n–Y is latest subframe which belongs to latest transmission burst and contains CRS (in a full SF and/or non-MBSFN SF) which starts no later than the subframe n–X while satisfying Y≥X (e.g. X=4).

In case of CSI-RS based transmission mode:

Option 1: the subframe n–Y is latest subframe which belongs to latest transmission burst and the latest transmission burst contains CSI-RS configured which starts no later than the subframe n–X. Or the subframe n–Y is latest Tx burst comprising reference signals (e.g., CSI-RS or CRS) for CSI measurement.

Option 2: the subframe n−Y is latest subframe which belongs to latest transmission burst and the latest transmission burst contains CSI-RS configured which starts no later than the subframe n−X while satisfying Y≥X (e.g. X=4). Or the subframe n−Y is latest Tx burst comprising reference signals (e.g., CSI-RS or CRS) for CSI measurement.

(2) For CSI report in a subframe n, the UE's CSI channel measurement is restricted within the transmission burst to which the CSI reference resource belongs. Or, the UE should do CSI channel measurement in the subframe n−Y (and may perform in other subframe in the transmission burst as well if it can reliably identify subframes belonging to a same TX burst). This equivalently means that the UE can assume QCL (quasi-collocation) of the reference signals for CSI measurement is achieved within that transmission burst but cannot assume QCL with other transmission bursts.

(3) Another way of doing the same thing is as follows. For CSI report in a subframe n, CSI reference resource in time domain is defined as a subframe n−Y.

CRS Based TM:

Option 1: the Subframe n−Y is latest valid subframe. In addition to the existing definition of valid subframe the following applies. A subframe is valid subframe only when it is part of a transmission burst containing CRS (in a full SF and/or non-MBSFN SF) which starts no later than a subframe n−X.

Option 2: the Subframe n−Y is latest valid subframe which satisfies Y≥X. In addition to the existing definition of valid subframe the following applies. A subframe is valid subframe only when it is part of a transmission burst containing CRS (in a full SF and/or non-MBSFN SF) which starts no later than a subframe n−X.

Option 3: the subframe n−Y is latest valid subframe which satisfies Y≥X. In addition to the existing definition of valid subframe the following applies. A subframe is valid subframe only when it is part of a transmission burst. And/or a subframe is valid subframe only when it consists of CRS (in a full SF and/or non-MBSFN SF).

CSI-RS Based TM:

Option 1: the subframe n−Y is latest valid subframe. In addition to the existing definition of valid subframe the following applies. A subframe is valid subframe only when it is part of a transmission burst containing CSI-RS configured which starts transmitted no later than a subframe n−X.

Option 2: the subframe n−Y is latest valid subframe which satisfies Y≥X. In addition to the existing definition of valid subframe the following applies. A subframe is valid subframe only when it is part of a transmission burst containing CSI-RS configured which starts transmitted no later than a subframe n−X.

(4) For CSI report in a subframe n, the UE's CSI channel measurement is restricted within the transmission burst to which the CSI reference resource belongs. Or, UE should do CSI channel measurement in a subframe n−Y (and may perform in other subframe in the transmission burst as well if it can reliably identify subframes belonging to a same TX burst). This equivalently means UE can assume QCL (quasi-collocation) of the reference signals for CSI measurement is achieved within that transmission burst but cannot assume QCL with other transmission bursts.

In the above, use of X can be equivalent with nCQI_ref in the current LTE system.

In the above, "transmission burst" may be in the UE perspective, detected as a transmission burst.

In some cases, the UE should detect more than 1 candidate scrambling sequence of CRS of a subframe to decide whether the subframe belongs to a transmission burst. In this case, it may be complex to the UE implementation to use this subframe for CSI measurement with CRS and/or CSI-RS. So, this subframe may not be defined as a valid subframe. Anyhow, it doesn't mean the UE should not perform CSI measurement in this subframe. Depending on the UE implementation, UE may or may not perform CSI measurement with CRS and/or CSI-RS. Applying this to invention c)-d) above results in, UE should not perform measurement in a TX burst which only consists of subframe(s) with multiple scrambling sequence candidates for CRS since it doesn't consists of any valid subframes, but the UE still can do CSI measurement in a TX burst which consists of subframe(s) with a single scrambling sequence candidates for CRS as long as it also consists of at least one valid subframe, where the UE may perform CSI measurement even in the subframe(s) with multiple scrambling sequence candidates for CRS and performs CSI averaging/interpolation/extrapolation calculation including those subframes.

In any cases, the following may applies. In addition to the existing definition of valid subframe, Initial partial subframe (may be only for CSI-RS based measurement) and/or end partial subframe (may be only for CSI-RS based measurement) and/or subframe (only) with reservation signal are not valid subframe:

Initial partial subframe: first subframe which doesn't start from the first OFDM symbol of the first subframe within a transmission burst.

End partial subframe: last subframe which doesn't end at the last OFDM symbol (or which ends before a certain OFDM symbol, e.g. before 13th OFDM symbol) of the last subframe within a transmission burst Reservation signal: signal prior to the start of normal subframes (including initial partial subframe) within a transmission burst to occupy channel or for synchronization.

Additionally, the subframe n−Y is latest valid subframe

4. Apparatus Construction

Figure 15:
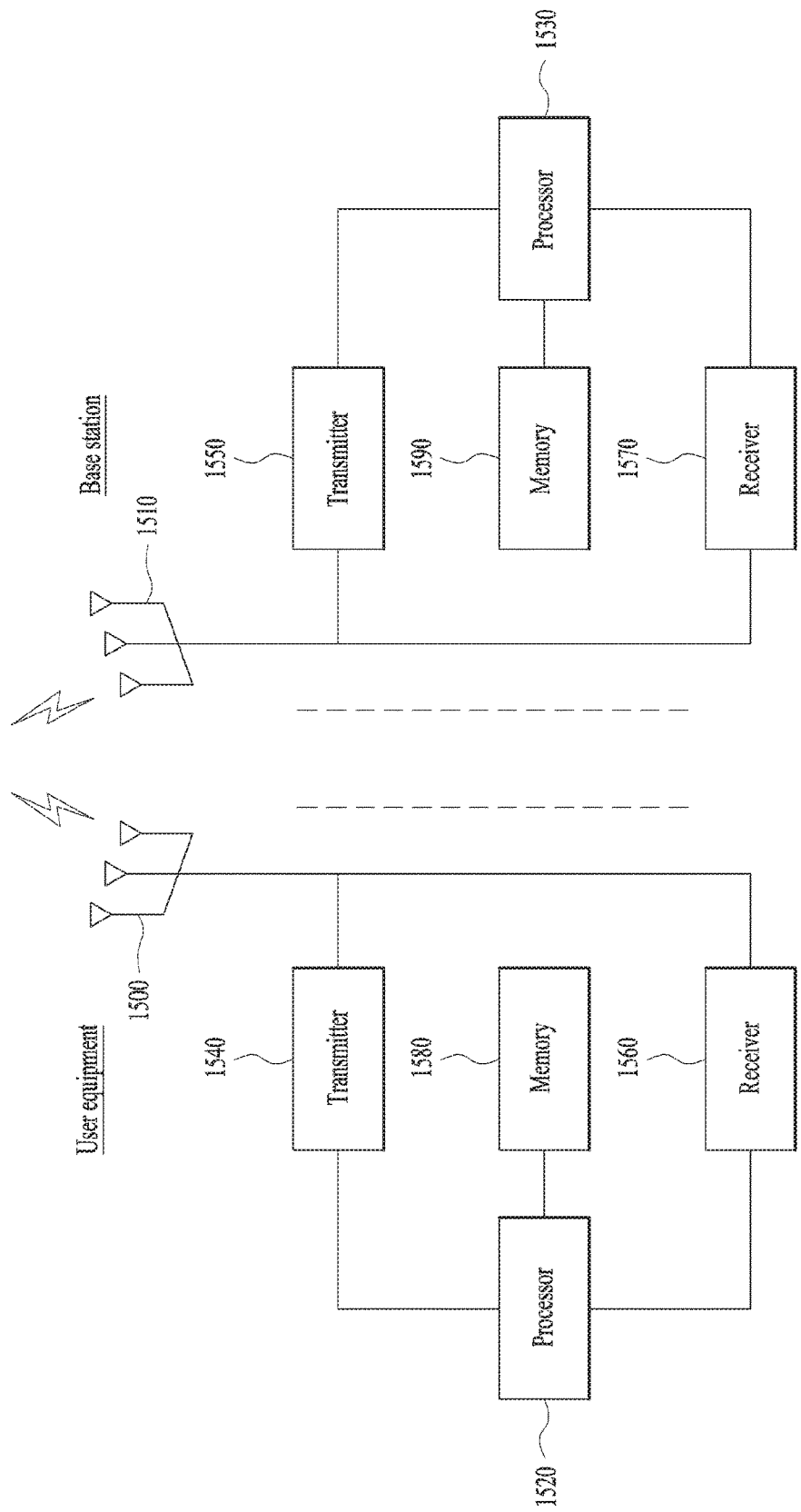
FIG. 15 is a diagram illustrating configuration of a UE and a BS in which the proposed embodiments can be implemented.

FIG. 15 is a diagram illustrating construction of a UE and a BS in which the proposed embodiments can be implemented. The UE and the BS illustrated in FIG. 15 operate to implement the embodiments of the afore-described CSI reporting method.

A UE may act as a transmission end on a UL and as a reception end on a DL. A BS may act as a reception end on a UL and as a transmission end on a DL.

That is, each of the UE and the BS may include a transmitter 1540 or 1550 and a receiver 1560 or 1570, for controlling transmission and reception of information, data, and/or messages, and an antenna 1500 or 1510 for transmitting and receiving information, data, and/or messages.

Each of the UE and the BS may further include a processor 1520 or 1530 for implementing the afore-described embodiments of the present invention and a memory 1580 or 1590 for temporarily or permanently storing operations of the processor 1520 or 1530.

The transmitters and receivers included in the UE and the eNB may perform a packet modulation/demodulation function for data transmission, a high-rate packing channel coding function, Orthogonal Frequency Division Multiple Access (OFDMA) packet scheduling, Time Division Duplex (TDD) packet scheduling, and/or a channel multiplexing function. In addition, the UE and the eNB of FIG. 15 may further include a low-power Radio Frequency (RF)/Intermediate Frequency (IF) unit.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory and executed by the processor. The memory is located at the interior or exterior of the processor and may transmit and receive data to and from the processor via various known means.

According to the embodiments of the present invention, the following effects can be achieved.

First, the UE can reliably perform CSI measurement and report CSI measurement even when Tx power of the eNB is dynamically changed in a wireless access system supporting an unlicensed band.

Second, the eNB can support proper scheduling for the UE using CSI through reliable CSI reporting by the UE.

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications The proposed methods are applicable to a millimeter wave (mmwave) communication system using an ultra high frequency band.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

What is claimed is:

1. A method of reporting Channel State Information (CSI) in a wireless communication system supporting an unlicensed band, the method performed by a User Equipment (UE) and comprising:
receiving, from a Base Station (BS), information identifying transmission bursts with respect to a plurality of subframes and subframe information related to an ending partial subframe, included in one or more consecutive subframes allocated for a certain transmission burst;
measuring CSI based on a Common Reference Signal (CRS) resource, a CSI Reference Signal (CSI-RS) resource, or a CSI Interference Measurement (CSI-IM) resource included in a predetermined number of Orthogonal Frequency Division Multiplexing (OFDM) symbols in the ending partial subframe; and
reporting the measured CSI,
wherein the UE assumes that transmission power of the BS is same for subframes included in the one or more consecutive subframes allocated for the certain transmission burst.

2. The method according to claim 1, wherein:
the information identifying transmission bursts have a value of 0 or 1;
information identifying a transmission burst with respect to an (N+1)-th subframe has a different value with information identifying a transmission burst with respect to an N-th subframe, when the transmission burst with respect to the N-th subframe is distinguished from the transmission burst with respect to the (N+1)-th subframe; and
N is a natural number.

3. The method according to claim 1, wherein:
the information identifying transmission bursts include one of a plurality of states;
information identifying a transmission burst with respect to an (N+1)-th subframe includes a following state of a state included in information identifying a transmission burst with respect to an N-th subframe, when the transmission burst with respect to the N-th subframe is distinguished from the transmission burst with respect to the (N+1)-th subframe; and
N is a natural number.

4. The method according to claim 1, further comprising:
initializing CSI measurement in a subframe when information identifying a transmission burst with respect to the subframe is not detected.

5. The method according to claim 1, wherein measuring the CSI includes measuring the CSI based on time-axis filtering.

6. The method according to claim 1, further comprising:
receiving transmission power information with respect to the plurality of subframes,
wherein measuring the CSI includes measuring scaled CSI based on a ratio of preset reference power information to transmission power information of the one or more consecutive subframes.

7. The method according to claim 1, wherein measuring the CSI includes measuring the CSI based only on interference configured in a preset range.

8. The method according to claim 1, wherein:
reporting the measured CSI includes reporting the measured CSI in an N-th subframe;
the one or more consecutive subframes are earlier than an (N−k)-th subframe:
N is a natural number; and
k is a preset value.

9. A User Equipment (UE) for reporting Channel State Information (CSI) in a wireless communication system supporting an unlicensed band, the UE comprising:
- a transmitter configured to transmit information;
- a receiver configured to receive information; and
- a processor connected to the transmitter and the receiver, and configured to: control the receiver to receive, from a Base Station (BS), information identifying transmission bursts with respect to a plurality of subframes and subframe information related to an ending partial subframe, included in one or more consecutive subframes allocated for a certain transmission burst;
- measure CSI based on a Common Reference Signal (CRS) resource, a CSI Reference Signal (CSI-RS) resource, or a CSI Interference Measurement (CSI-IM) resource included in a predetermined number of Orthogonal Frequency Division Multiplexing (OFDM) symbols in the ending partial subframe; and
- control the transmitter to report the measured CSI,
- wherein the UE assumes that transmission power of the BS is same for subframes included in the one or more consecutive subframes allocated for the certain transmission burst.

10. The UE according to claim 9, wherein:
- the information identifying transmission bursts have a value of 0 or 1;
- information identifying a transmission burst with respect to an (N+1)-th subframe has a different value with information identifying a transmission burst with respect to an N-th subframe, when the transmission burst with respect to the N-th subframe is distinguished from the transmission burst with respect to the (N+1)-th subframe; and
- N is a natural number.

11. The UE according to claim 9, wherein:
- the received information identifying transmission bursts include one of a plurality of states;
- information identifying a transmission burst with respect to an (N+1)-th subframe includes a following state of a state included in information identifying a transmission burst with respect to an N-th subframe, when the transmission burst with respect to the N-th subframe is distinguished from the transmission burst with respect to the (N+1)-th subframe; and
- N is a natural number.

12. The UE according to claim 9, wherein the processor is further configured to:
- initialize CSI measurement in a subframe when information identifying a transmission burst with respect to the subframe is not detected.

13. The UE according to claim 9, wherein measuring the CSI includes measuring the CSI based on time-axis filtering.

14. The UE according to claim 9, wherein:
- the processor is further configured to control the receiver to receive transmission power information with respect to the plurality of subframes; and
- measuring the CSI includes measuring scaled CSI based on a ratio of preset reference power information to transmission power information of the one or more consecutive subframes.

15. The UE according to claim 9, wherein measuring the CSI includes measuring the CSI based only on interference configured in a preset range.

16. The UE according to claim 9, wherein:
- reporting the measured CSI includes reporting the measured CSI in an N-th subframe;
- the one or more consecutive subframes are earlier than an (N−k)-th subframe;
- N is a natural number; and
- k is a preset value.

* * * * *